US009633402B1

(12) United States Patent
McCartney

(10) Patent No.: US 9,633,402 B1
(45) Date of Patent: Apr. 25, 2017

(54) SYSTEM AND METHOD FOR SEAT SEARCH COMPARISON AND SELECTION BASED ON PHYSICAL CHARACTERISTICS OF TRAVELERS

(71) Applicant: Seatwizer OU, Tallinn (EE)

(72) Inventor: Richard Charles McCartney, Tallinn (EE)

(*) Notice: Subject to any disclaimer, the term of this patent is extended or adjusted under 35 U.S.C. 154(b) by 0 days.

(21) Appl. No.: 15/268,469

(22) Filed: Sep. 16, 2016

(51) Int. Cl.
G06Q 10/02 (2012.01)
G06Q 30/06 (2012.01)
G06Q 50/14 (2012.01)

(52) U.S. Cl.
CPC ............ *G06Q 50/14* (2013.01); *G06Q 10/02* (2013.01); *G06Q 30/0627* (2013.01); *G06Q 30/0629* (2013.01); *G06Q 30/0643* (2013.01); *G06Q 30/0601* (2013.01); *G06Q 30/0623* (2013.01); *G06Q 30/0625* (2013.01)

(58) Field of Classification Search
None
See application file for complete search history.

(56) References Cited

U.S. PATENT DOCUMENTS

| 7,908,158 | B2 * | 3/2011 | Stirlen | G06Q 10/02 |
| | | | | 705/5 |
| 8,423,324 | B2 * | 4/2013 | Boin | B61D 1/04 |
| | | | | 244/118.6 |
| 8,678,311 | B2 * | 3/2014 | Cheung | B64D 11/00 |
| | | | | 105/345 |
| 2009/0063204 | A1 * | 3/2009 | Stirlen | G06Q 30/00 |
| | | | | 705/5 |
| 2009/0065642 | A1 * | 3/2009 | Cheung | B64D 11/00 |
| | | | | 244/118.6 |
| 2009/0319902 | A1 * | 12/2009 | Kneller | G06F 3/013 |
| | | | | 715/733 |
| 2011/0010135 | A1 * | 1/2011 | Boin | B61D 1/04 |
| | | | | 703/1 |
| 2011/0282701 | A1 * | 11/2011 | Reiz | G06Q 30/0641 |
| | | | | 705/5 |

(Continued)

OTHER PUBLICATIONS

Klinich, K.D., et al., "Crash Protection for Child Passengers: Rationale for Best Practice," The UMTRI Research Review, 43.1 (Jan.-Mar. 2012): 1-35.*

*Primary Examiner* — Nicholas D Rosen
(74) *Attorney, Agent, or Firm* — Wilson, Sonsini, Goodrich & Rosati

(57) ABSTRACT

Disclosed herein are system, media, and method for flight searching, comparison, and selection based on physical characteristics of travelers and usable seat space comprising a database of seats with seat spaces, and an application comprising: a software module allowing a traveler to enter physical information and search criteria; a software module calculating a volumetric physical space of the traveler; a software module generating a list of seats based on the physical information and said search criteria, the list comprising: an optimal seat and competing seats, wherein one of the competing seats has a greater seat space while the other has less seat space that of the optimal seat; a software module allowing visual comparison the volumetric physical space to various seat spaces; a software module generating a travel avatar of the traveler; and a software module allowing visualization of three-dimensional movement of the travel avatar in a virtual seat.

27 Claims, 14 Drawing Sheets

(56) References Cited

U.S. PATENT DOCUMENTS

| | | | |
|---|---|---|---|
| 2013/0054279 A1* | 2/2013 | Sharp | G06Q 10/06 705/5 |
| 2014/0052482 A1* | 2/2014 | Le Marier | G06Q 10/02 705/5 |
| 2015/0332176 A1* | 11/2015 | Shaw | G06Q 10/02 705/5 |
| 2016/0358272 A1 | 12/2016 | Howe | |

* cited by examiner

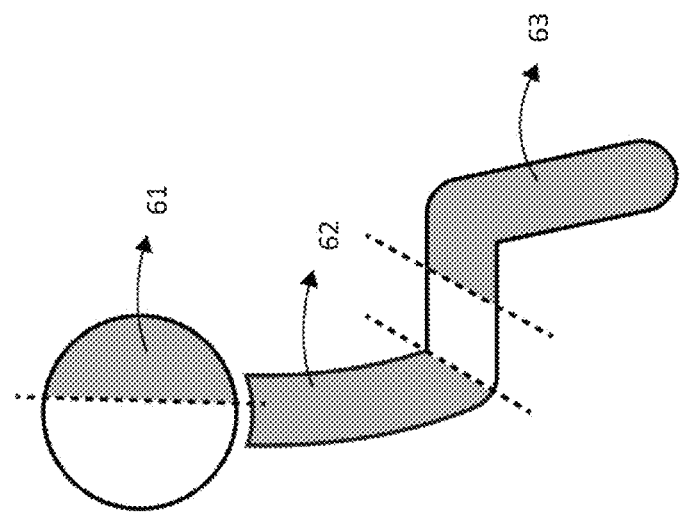
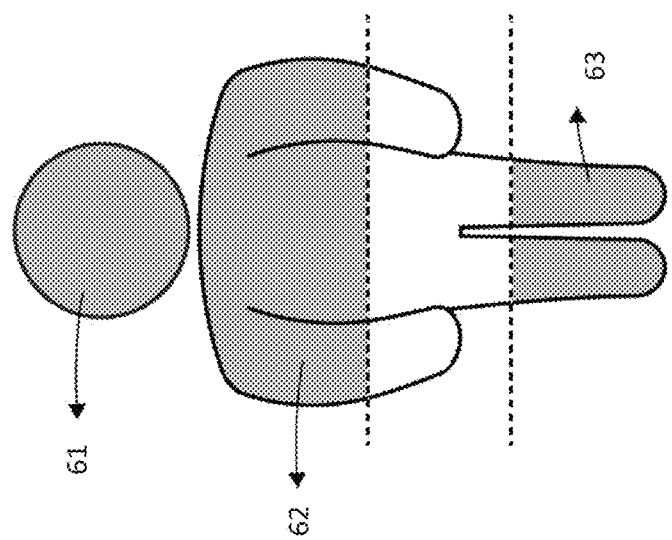
Fig. 6

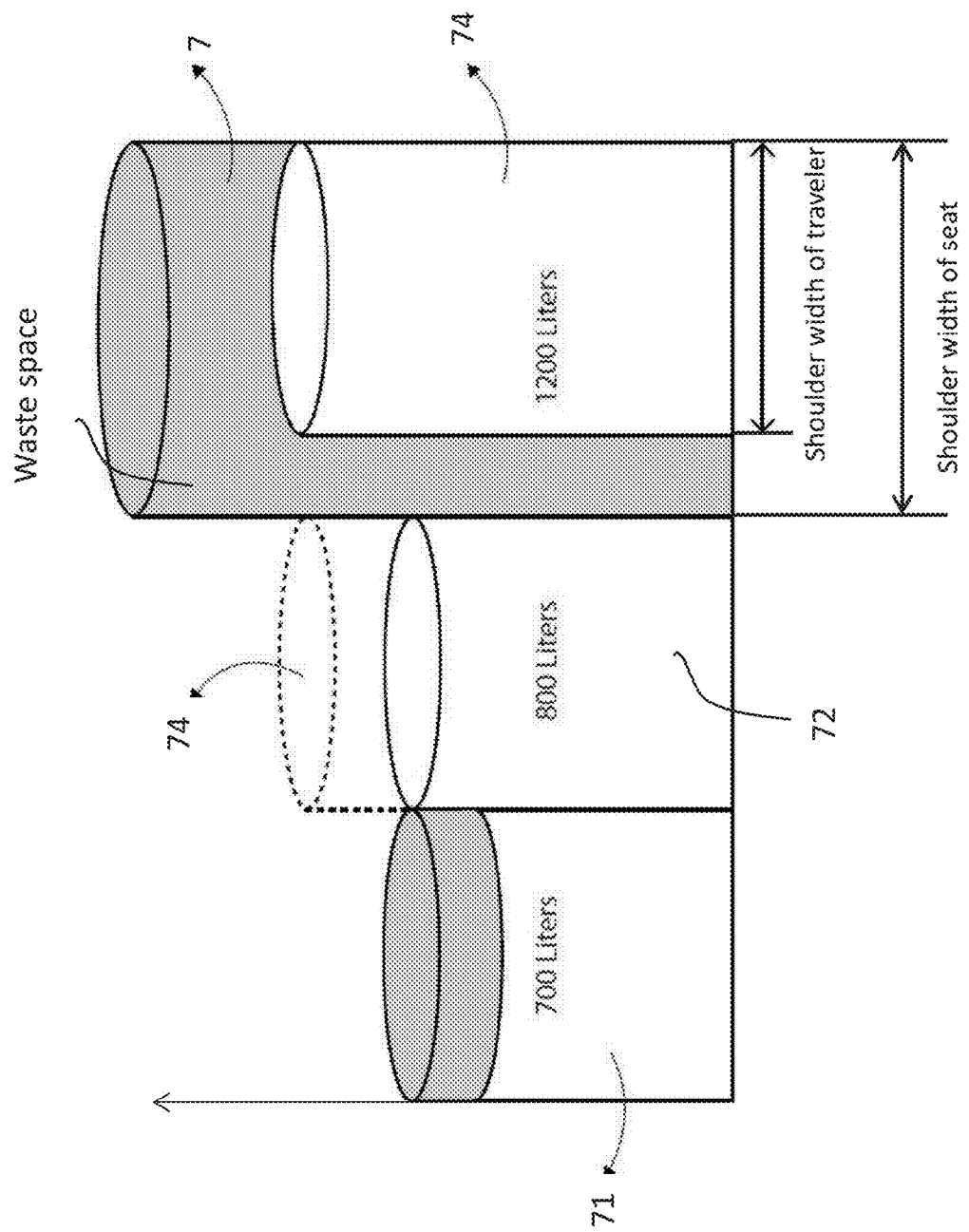

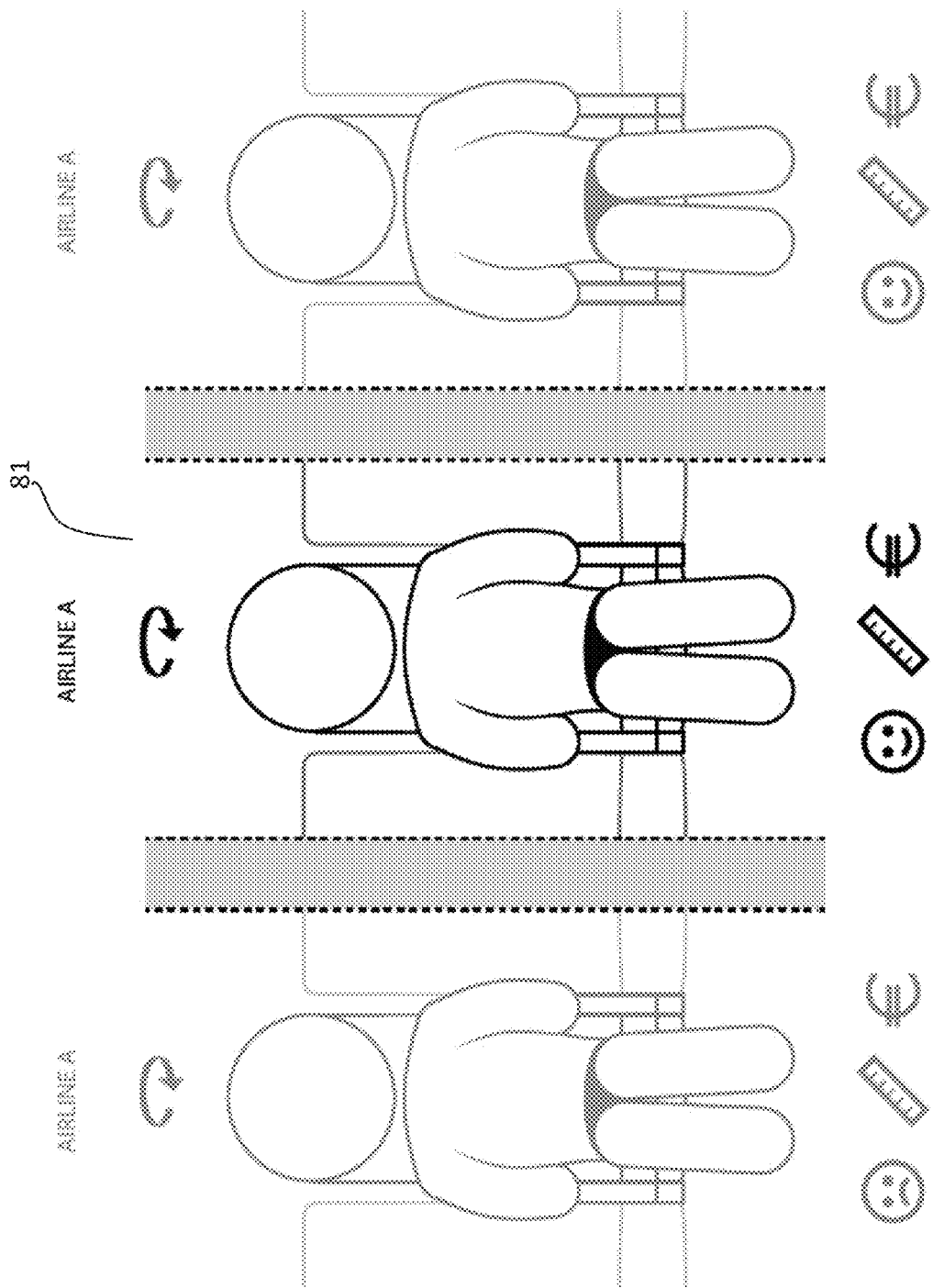

SYSTEM AND METHOD FOR SEAT SEARCH COMPARISON AND SELECTION BASED ON PHYSICAL CHARACTERISTICS OF TRAVELERS

CROSS-REFERENCE TO RELATED APPLICATIONS

The present application claims the benefit of U.S. Provisional Application No. 62/193,614 entitled "Flight search, comparison, differentiation and retail system," filed Jul. 17, 2015, the entire contents of which are incorporated herein by reference.

BACKGROUND OF THE INVENTION

Online search systems and methods are becoming more and more inevitable for traveler in order to find airfare, hotel, theatre tickets and more. Existing search systems and methods primarily search by the lowest cost and/or by the traveler's schedule.

SUMMARY OF THE INVENTION

Existing systems and methods that generate flight search results primarily use a combination of flight time, connections, and cost for the flights. There is no known system or method that compares and differentiate commercial flight and flight seats based on a traveler's physical characteristics and the usable space of flight seat in which the traveler will fly. Existing systems and methods that provide information of the size of a seat, for example, a flight seat, to travelers are limited to cabin types or airline-generated dimensions. This is a one-size-fits-all approach, and it fails to take any consideration of the different physical size of travelers, which may vary vastly from one individual to another. Further, the airline-generated dimensions can be misleading and irrelevant to the true size. For examples, certain industry standard for airplane seat width is the distance between the armrests. Changes to the armrests width change the measured seat width, but it does not provide extra seat space to the passenger. Furthermore, certain airline-generated measurements are not easily understandable for travelers, for examples, a pitch of a seat. Thus, the traveler would have difficulties in linking these measurements to the level of comfort they can achieve while seating, working, or resting in the flight seat. Yet further, opinions regarding inflight experience by a small group of travelers can be subjective and may not be applicable to other passengers with different preferences. Thus, there is a demand for searches, comparisons, and differentiations of commercial flights based on the cost of the flight with the usable space and comfort provided at that cost. It is also desirable for a traveler to visualize the seating experiences in different flight seats and the comparison of various flight seats.

The systems, methods, and media disclosed herein advantageously provides the capability for searching, comparing, differentiating, and optionally retailing commercial flight seats based upon a traveler's physical measurements, the usable space of the aircraft seat, the cost, and optionally in combination with the traveler's other personal preferences, personality, and the opinions of travelers that may have similar physical measurements and/or preferences. The systems, methods, and media disclosed herein advantageously enable the traveler to make a more informed decision when choosing a flight. The systems, methods, and media disclosed herein may produce an optimal seat result for a specific traveler based on the input of the user's physical information and additionally with preferences of cost, space, and other aspects. By producing an optimal seat, the systems, methods, and media enable the traveler to scroll through a list of results in either direction away from the optimum seat to find cheaper but less comfortable seats or in the opposite direction, to find more comfortable and expensive seats. In addition, the systems, methods, and media disclosed herein allow direct, simple, and convenient visual comparison of the physical volumetric size of the traveler with seat spaces of a plurality of seats in the list of results. As an example, the visual comparison may include bar graph indicative not only of the comparison of total space of the passenger and seat(s), but also of other detailed measurements including but not limited to shoulder width, arm-rest width, and/or pitch. The bars may be in two-dimensions or three dimensions. Further, the systems, methods, and media disclosed herein additionally provide a three-dimensional interactive visualization of the passenger sitting in the optimal seat or any other seats of choice. A traveler's avatar can be placed in the selected flight seat in two dimensional and/or three-dimensional virtual space and the avatar may move in the seat passively with the seat adjustment or actively while the seat stays still. Such visualization provides comprehensive, direct, convenient, and easy-to-understand information regarding a flight seat that cannot be readily obtained in any existing flight seat selection or differentiation tools. Furthermore, the systems, methods, and media disclosed herein has the advantageous of providing complementary text or color coding that may be used to provide information that has not been included in the graphical information. Such complementary information may be related to location, environment, comfort, or other aspects of the seat.

In one aspect, the systems, methods, and media disclosed herein includes a computer-implemented system for flight seat searching, comparison, and selection based on physical characteristics of travelers and usable flight seat space, the system comprising: a digital processing—device comprising an operating system configured to perform executable instructions and a memory; a database of a plurality of seats, each of the plurality of seats comprising a seat space; and a computer program including instructions executable by the digital processing device to create a flight seat searching, comparison, and selection application comprising: a software module allowing a traveler to enter physical information of the traveler and one or more search criteria; a software module calculating a volumetric physical space that the traveler needs based on the physical information; a software module generating a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; a software module allowing the traveler to visually compare the calculated volumetric physical space of the traveler with seat spaces of a plurality of seats in the list; a software module allowing the traveler to select a seat from the list; a software module generating a travel avatar based on the physical information of the traveler, the travel avatar being three-dimensional; and a software module allowing the traveler to visualize three-dimensional movement of the travel avatar in the selected seat, the traveler represented by the travel avatar and the selected seat represented by a virtual seat. In some embodiments, the plurality of seats is flight seats. In some embodiments, the seat space comprises one or more selected from: a total seat space, a seat width, a seat pitch, a seat-back height, a total usable seat space, a usable seat width at a base level, a usable seat width at a shoulder level, a usable seat pitch, an arm-rest width, a distance between bases of seat-back cushion in two adjacent rows, and a distance between head-rests in two adjacent rows. In some embodiments, the physical information of the traveler comprises a height, a shoulder width, a hip width, a leg length, a femur length, a body weight, a body shape, a body mass index, or a combination thereof. In some embodiments, the one or more search criteria includes a type of aircraft, an age of aircraft, duration of flight, duration of stay, number of connections, departure time, return time, a price range, priority boarding, a window seat, an aisle seat, an exit-row seat, a back-row seat, a front-row seat, a cabin type, in-seat power outlet, food, beverage, an in-seat digital display, in-seat entertainment, WI-FI, a distance to a lavatory, a review rating, or a combination thereof. In some embodiments, the one or more search criteria are weighted based on one or more of the traveler's preference. In some cases, the review rating is from a second traveler that has similar physical information as the traveler. In some embodiments, the volumetric physical space that the traveler needs comprises a shoulder width, a hip width, a leg length, or a combination thereof. In some embodiments, the volumetric physical space of the traveler is distinguished to the seat spaces at least by color. In some embodiments, the visual comparison comprises graphical information and text information. In some embodiments, the travel avatar has a first scaling from the physical information of the traveler and the virtual seat has a second scaling from the seat space of the selected seat, the first scaling and the second scaling being three dimensional and equal to each other. In some embodiments, the travel avatar and the virtual seat are color-coded such that a first area of the travel avatar is in a same color as a second area of the virtual seat that the first area moves with or in contact with. In some embodiments, the three-dimensional movement of the travel avatar in the selected seat is passive and caused by movement of the virtual seat in three-dimensions. In some embodiments, the three-dimensional movement of the travel avatar in the selected seat is active and not caused by movement of the virtual seat in three-dimensions. In some embodiments, the system disclosed herein further comprises a software module allowing a traveler to move the virtual seat thereby causing the travel avatar to move passively along with the virtual seat in three-dimensions, or the travel avatar actively in three-dimensions when the virtual seat remains static. In some cases, the movement of the virtual seat comprises change a pitch of the virtual seat, moving the arm-rest, moving a window shield, moving a foldable table, or a combination thereof. In some cases, the movement of the virtual seat or the travel avatar is via interaction on the virtual seat with an input device. In some cases, the interaction comprises a touch, a click, a drag, a tap, pointing, pressing, swiping, contouring, a gesture, circling, crossing, highlighting, or a combination thereof. In some cases, the input device comprises a mouse, a keyboard, a pointer, a touch screen, a camera, a microphone, a motion sensor, a sound sensor, a pressure sensor, a temperature sensor, or a combination thereof. In some cases, the system as disclosed herein further comprises a software module allowing a traveler to compare the selected seat in a seat map to one or more other seats in the seat map, the seat map comprising text information of the one or more other seat, wherein the text information is not a flight number, a price, a cabin type, a seat number, or a row number of the one or more seats. In some cases, the system as disclosed herein further comprises a software module generating a second list of seats based on the physical information of the traveler, the second list of seats being in a connection flight, a return flight, a transportation means, an accommodation, or an entertainment facility. In some cases, the system as disclosed herein further comprises a software module calculating personality of travel avatar based on data from sources external to said computer-implemented system. In some embodiments, the one or more search criteria include one or more aspects of personal preferences of the traveler, one or more aspects of the personality of traveler, or both. In some cases, the system as disclosed herein further comprises a software module allowing the traveler to visually compare the first seat space of the optimal seat with seat spaces of the competing seats in the list. In some cases, the one of the two or more competing seats has a second cost per unit seat space that is higher than the first cost per unit space and the other has a third cost per unit seat space that is lower than the first cost per unit space.

In another aspect, disclosed herein includes non-transitory computer-readable storage media encoded with a computer program including instructions executable by a processor to create a flight seat searching, comparison, and selection application based on physical characteristics of travelers and usable flight seat space comprising: a database, in a computer memory, of a plurality of seats, each of the plurality of seats comprising a seat space; a software module allowing a traveler to enter physical information of the traveler and one or more search criteria; a software module calculating a volumetric physical space that the traveler needs based on the physical information; a software module generating a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; a software module allowing the traveler to visually compare the calculated volumetric physical space of the traveler with seat spaces of a plurality of seats in the list; a software module allowing the traveler to select a seat from the list; a software module generating a travel avatar based on the physical information of the traveler, the travel avatar being three-dimensional; and a software module allowing the traveler to visualize three-dimensional movement of the travel avatar in the selected seat, the traveler represented by the travel avatar and the selected seat represented by a virtual seat. In some embodiments, the plurality of seats is flight seats. In some embodiments, the seat space comprises one or more selected from: a total seat space, a seat width, a seat pitch, a seat-back height, a total usable seat space, a usable seat width at a base level, a usable seat width at a shoulder level, a usable seat pitch, an arm-rest width, a distance between bases of seat-back cushion in two adjacent rows, and a distance between head-rests in two adjacent rows. In some embodiments, the physical information of the traveler comprises a height, a shoulder width, a hip width, a leg length, a femur length, a body weight, a body shape, a body mass index, or a combination thereof. In some embodiments, the one or more search criteria includes a type of aircraft, an age of aircraft, duration of flight, duration of stay, number of connections, departure time, return time, a price range, priority boarding, a window seat, an aisle seat, an exit-row seat, a back-row seat, a front-row seat, a cabin type, in-seat power outlet, food, beverage, an in-seat digital display, in-seat entertainment, WI-FI, a distance to a lavatory, a review rating, or a combination thereof. In some embodiments, the one or more search criteria are weighted based on one or more of the traveler's preference. In some cases, the review rating is from a second traveler that has similar physical information as the traveler. In some embodiments, the volumetric physical space that the traveler needs comprises a shoulder width, a hip width, a leg length, or a combination thereof. In some embodiments, the volumetric physical space of the traveler is distinguished to the seat spaces at least by color. In some embodiments, the visual comparison comprises graphical information and text information. In some embodiments, the travel avatar has a first scaling from the physical information of the traveler and the virtual seat has a second scaling from the seat space of the selected seat, the first scaling and the second scaling being three dimensional and equal to each other. In some embodiments, the travel avatar and the virtual seat are color-coded such that a first area of the travel avatar is in a same color as a second area of the virtual seat that the first area moves with or in contact with. In some embodiments, the three-dimensional movement of the travel avatar in the selected seat is passive and caused by movement of the virtual seat in three-dimensions. In some embodiments, the three-dimensional movement of the travel avatar in the selected seat is active and not caused by movement of the virtual seat in three-dimensions. In some embodiments, the media disclosed herein further comprises a software module allowing a traveler to move the virtual seat thereby causing the travel avatar to move passively along with the virtual seat in three-dimensions, or the travel avatar actively in three-dimensions when the virtual seat remains static. In some cases, the movement of the virtual seat comprises change a pitch of the virtual seat, reclining the seat back, moving the arm-rest, moving a window shield, moving a head-rest, moving a foldable table, or a combination thereof. In some cases, the movement of the virtual seat comprises any movement that mimics the actual movement of one or more neighboring seats to the virtual seat. For example, reclining the seat in front of the virtual seat. In some cases, the movement of the virtual seat or the travel avatar is via interaction on the virtual seat with an input device. In some cases, the interaction comprises a touch, a click, a drag, a tap, pointing, pressing, swiping, contouring, a gesture, circling, crossing, highlighting, or a combination thereof. In some cases, the input device comprises a mouse, a keyboard, a pointer, a touch screen, a camera, a microphone, a motion sensor, a sound sensor, a pressure sensor, a temperature sensor, or a combination thereof. In some cases, the media as disclosed herein further comprises a software module allowing a traveler to compare the selected seat in a seat map to one or more other seats in the seat map, the seat map comprising text information of the one or more other seat, wherein the text information is not a flight number, a price, a cabin type, a seat number, or a row number of the one or more seats. In some cases, the media as disclosed herein further comprises a software module generating a second list of seats based on the physical information of the traveler, the second list of seats being in a connection flight, a return flight, a transportation means, an accommodation, or an entertainment facility. In some cases, the media as disclosed herein further comprises a software module calculating personality of travel avatar based on data from sources external to said media. In some embodiments, the one or more search criteria include one or more aspects of personal preferences of the traveler, one or more aspects of the personality of traveler, or both. In some cases, the media as disclosed herein further comprises a software module allowing the traveler to visually compare the first seat space of the optimal seat with seat spaces of the competing seats in the list. In some cases, the one of the two or more competing seats has a second cost per unit seat space that is higher than the first cost per unit space and the other has a third cost per unit seat space that is lower than the first cost per unit space.

In another aspect, disclosed herein is a computer-implemented method for flight seat searching, comparison, and selection based on physical characteristics of travelers and usable flight seat space, the method comprising: allowing, by a computer, a traveler to enter physical information of the traveler and one or more search criteria; calculating, by the computer, a volumetric physical space that the traveler needs based on the physical information; generating, by a computer, a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; allowing, by the computer, the traveler to visually compare the calculated volumetric physical space of the traveler with seat spaces of a plurality of seats in the list; allowing, by the computer, the traveler to select a seat from the list; generating, by the computer, a travel avatar based on the physical information of the traveler, the travel avatar being three-dimensional; and allowing, by the computer, the traveler to visualize three-dimensional movement of the travel avatar in the selected seat, the traveler represented by the travel avatar and the selected seat represented by a virtual seat. In some embodiments, the plurality of seats is flight seats. In some embodiments, the seat space comprises one or more selected from: a total seat space, a seat width, a seat pitch, a seat-back height, a total usable seat space, a usable seat width at a base level, a usable seat width at a shoulder level, a usable seat pitch, an arm-rest width, a distance between bases of seat-back cushion in two adjacent rows, and a distance between head-rests in two adjacent rows. In some embodiments, the physical information of the traveler comprises a height, a shoulder width, a hip width, a leg length, a femur length, a body weight, a body shape, a body mass index, or a combination thereof. In some embodiments, the one or more search criteria includes a type of aircraft, an age of aircraft, duration of flight, duration of stay, number of connections, departure time, return time, a price range, priority boarding, a window seat, an aisle seat, an exit-row seat, a back-row seat, a front-row seat, a cabin type, in-seat power outlet, food, beverage, an in-seat digital display, in-seat entertainment, WI-FI, a distance to a lavatory, a review rating, or a combination thereof. In some embodiments, the one or more search criteria are weighted based on one or more of the traveler's preference. In some cases, the review rating is from a second traveler that has similar physical information as the traveler. In some embodiments, the volumetric physical space that the traveler needs comprises a shoulder width, a hip width, a leg length, or a combination thereof. In some embodiments, the volumetric physical space of the traveler is distinguished to the seat spaces at least by color. In some embodiments, the visual comparison comprises graphical information and text information. In some embodiments, the travel avatar has a first scaling from the physical information of the traveler and the virtual seat has a second scaling from the seat space of the selected seat, the first scaling and the second scaling being three dimensional and equal to each other. In some embodiments, the travel avatar and the virtual seat are color-coded such that a first area of the travel avatar is in a same color as a second area of the virtual seat that the first area moves with or in contact with. In some embodiments, the three-dimensional movement of the travel avatar in the selected seat is passive and caused by movement of the virtual seat in three-dimensions. In some embodiments, the three-dimensional movement of the travel avatar in the selected seat is active and not caused by movement of the virtual seat in three-dimensions. In some embodiments, the method disclosed herein further comprises allowing a traveler to move the virtual seat thereby causing the travel avatar to move passively along with the virtual seat in three-dimensions, or the travel avatar actively in three-dimensions when the virtual seat remains static. In some cases, the movement of the virtual seat comprises change a pitch of the virtual seat, moving the arm-rest, moving a window shield, moving a foldable table, or a combination thereof. In some cases, the movement of the virtual seat or the travel avatar is via interaction on the virtual seat with an input device. In some cases, the interaction comprises a touch, a click, a drag, a tap, pointing, pressing, swiping, contouring, a gesture, circling, crossing, highlighting, or a combination thereof. In some cases, the input device comprises a mouse, a keyboard, a pointer, a touch screen, a camera, a microphone, a motion sensor, a sound sensor, a pressure sensor, a temperature sensor, or a combination thereof. In some cases, the method as disclosed herein further comprises allowing a traveler to compare the selected seat in a seat map to one or more other seats in the seat map, the seat map comprising text information of the one or more other seat, wherein the text information is not a flight number, a price, a cabin type, a seat number, or a row number of the one or more seats. In some cases, the method as disclosed herein further comprises generating a second list of seats based on the physical information of the traveler, the second list of seats being in a connection flight, a return flight, a transportation means, an accommodation, or an entertainment facility. In some cases, the method as disclosed herein further comprises a software module calculating personality of travel avatar based on data from sources external to said method. In some embodiments, the one or more search criteria include one or more aspects of personal preferences of the traveler, one or more aspects of the personality of traveler, or both. In some cases, the method as disclosed herein further comprises allowing the traveler to visually compare the first seat space of the optimal seat with seat spaces of the competing seats in the list. In some cases, the one of the two or more competing seats has a second cost per unit seat space that is higher than the first cost per unit space and the other has a third cost per unit seat space that is lower than the first cost per unit space.

In an alternative aspect, disclosed herein is a computer-implemented system for seat searching, comparison, and selection based on physical characteristics of travelers and usable seat space, the system comprising: a digital processing device comprising an operating system configured to perform executable instructions and a memory; a database of a plurality of seats, each of the plurality of seats comprising a seat space; and a computer program including instructions executable by the digital processing device to create a seat searching, comparison, and selection application comprising: a software module allowing a traveler to enter physical information of the traveler and one or more search criteria; a software module calculating a volumetric physical space that the traveler needs based on the physical information; a software module generating a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; a software module allowing the traveler to visually compare the calculated volumetric physical space of the traveler with seat spaces of a plurality of seats in the list; a software module allowing the traveler to select a seat from the list; a software module that generates a travel avatar based on the physical information of the traveler, the travel avatar being three-dimensional; and a software module allowing the traveler to visualize three-dimensional movement of the travel avatar in the selected seat, the traveler represented by the travel avatar and the selected seat represented by a virtual seat. In some instances, the plurality of seats is in a transportation means, an accommodation, or an entertainment facility. In some cases, the plurality of seats is not in a commercial flight. In some cases, the seat space comprises one or more selected from: a total seat space, a seat width, a seat pitch, a seat-back height, a total usable seat space, a usable seat width at a base level, a usable seat width at a shoulder level, a usable seat pitch, an arm-rest width, a distance between bases of seatback cushion in two adjacent rows, and a distance between head-rests in two adjacent rows. In some cases, the physical information of the traveler comprises a height, a shoulder width, a hip width, a leg length, a femur length, a body weight, a body shape, a body mass index, or a combination thereof. In some cases, the one or more search criteria includes a type of a transportation means, an age of the transportation means, duration of transportation, duration of stay, number of connections, departure time, return time, a price range, in-seat power, food, beverage, an in-seat digital display, in-seat entertainment, WI-FI, distance to a lavatory, a review rating, or a combination thereof. In some cases, the one or more search criteria are weighted based on one or more of the traveler's preference. In some cases, the review rating is from a second traveler that has similar physical information as the traveler. In some cases, the volumetric physical space that the traveler needs comprises a shoulder width, a hip width, a leg length, or a combination thereof. In some cases, the volumetric physical space of the traveler is distinguished to the seat spaces at least by color. In some cases, the visual comparison comprises graphical information and text information. In some cases, the travel avatar has a first scaling from the physical information of the traveler and the virtual seat has a second scaling from the seat space of the selected seat, the first scaling and the second scaling being three dimensional and equal to each other. In some cases, the travel avatar and the virtual seat are color-coded such that a first area of the travel avatar is in a same color as a second area of the virtual seat that the first area moves with. In some cases, the three-dimensional movement of the travel avatar in the selected seat is passive and caused by movement of the virtual seat in three-dimensions. In some cases, the three-dimensional movement of the travel avatar in the selected seat is active and not caused by movement of the virtual seat in three-dimensions. In some cases, the system further comprises a software module allowing a traveler to move the virtual seat thereby causing the travel avatar to move passively along with the virtual seat in three-dimensions, or the travel avatar in three-dimensions when the virtual seat remains static. In some cases, the movement of the virtual seat comprises change a pitch of the virtual seat, moving the arm-rest, moving a window shield, moving a foldable table, or a combination thereof. In some cases, the movement of the virtual seat or the travel avatar is via interaction on the virtual seat with an input device. In some cases, the interaction comprises a touch, a click, a drag, a tap, pointing, pressing, swiping, contouring, a gesture, circling, crossing, highlighting, or a combination thereof. In some cases, the input device comprises a mouse, a keyboard, a pointer, a touch screen, a camera, a microphone, a motion sensor, a sound sensor, a pressure sensor, a temperature sensor, or a combination thereof. In some cases, the system further comprises a software module allowing a traveler to compare the selected seat in a seat map to one or more other seats in the seat map, the seat map comprising text information of the one or more other seat, wherein the text information is not a price, a cabin type, a seat number, or a row number of the one or more seats. In some cases, the system further comprises a software module calculating personality of travel avatar based on data from sources external to said computer-implemented system. In some embodiments, the one or more search criteria include one or more aspects of personal preferences of the traveler, one or more aspects of the personality of traveler, or both. In some cases, the system further comprises a software module allowing the traveler to visually compare the first seat space of the optimal seat with seat spaces of the competing seats in the list. In some embodiments, one of the two or more competing seats has a second cost per unit seat space that is higher than the first cost per unit space and the other has a third cost per unit seat space that is lower than the first cost per unit space.

In yet another aspect, disclosed herein is non-transitory computer-readable storage media encoded with a computer program including instructions executable by a processor to create a seat searching, comparison, and selection application based on physical characteristics of travelers and usable seat space comprising: a database, in a computer memory, of a plurality of seats, each of the plurality of seats comprising a seat space; a software module allowing a traveler to enter physical information of the traveler and one or more search criteria; a software module calculating a volumetric physical space that the traveler needs based on the physical information; a software module generating a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; a software module allowing the traveler to visually compare the calculated volumetric physical space of the traveler with seat spaces of a plurality of seats in the list; a software module allowing the traveler to select a seat from the list; a software module that generates a travel avatar based on the physical information of the traveler, the travel avatar being three-dimensional; and a software module that allowing the traveler to visualize three-dimensional movement of the travel avatar in the selected seat, the traveler represented by the travel avatar and the selected seat represented by a virtual seat. In some instances, the plurality of seats is in a transportation means, an accommodation, or an entertainment facility. In some cases, the plurality of seats is not in a commercial flight. In some cases, the seat space comprises one or more selected from: a total seat space, a seat width, a seat pitch, a seat-back height, a total usable seat space, a usable seat width at a base level, a usable seat width at a shoulder level, a usable seat pitch, an arm-rest width, a distance between bases of seat-back cushion in two adjacent rows, and a distance between head-rests in two adjacent rows. In some cases, the physical information of the traveler comprises a height, a shoulder width, a hip width, a leg length, a femur length, a body weight, a body shape, a body mass index, or a combination thereof. In some cases, the one or more search criteria includes a type of a transportation means, an age of the transportation means, duration of transportation, duration of stay, number of connections, departure time, return time, a price range, in-seat power, food, beverage, an in-seat digital display, in-seat entertainment, WI-FI, distance to a lavatory, a review rating, or a combination thereof. In some cases, the one or more search criteria are weighted based on one or more of the traveler's preference. In some cases, the review rating is from a second traveler that has similar physical information as the traveler. In some cases, the volumetric physical space that the traveler needs comprises a shoulder width, a hip width, a leg length, or a combination thereof. In some cases, the volumetric physical space of the traveler is distinguished to the seat spaces at least by color. In some cases, the visual comparison comprises graphical information and text information. In some cases, the travel avatar has a first scaling from the physical information of the traveler and the virtual seat has a second scaling from the seat space of the selected seat, the first scaling and the second scaling being three dimensional and equal to each other. In some cases, the travel avatar and the virtual seat are color-coded such that a first area of the travel avatar is in a same color as a second area of the virtual seat that the first area moves with. In some cases, the three-dimensional movement of the travel avatar in the selected seat is passive and caused by movement of the virtual seat in three-dimensions. In some cases, the three-dimensional movement of the travel avatar in the selected seat is active and not caused by movement of the virtual seat in three-dimensions. In some cases, the media further comprises a software module allowing a traveler to move the virtual seat thereby causing the travel avatar to move passively along with the virtual seat in three-dimensions, or the travel avatar in three-dimensions when the virtual seat remains static. In some cases, the movement of the virtual seat comprises change a pitch of the virtual seat, moving the arm-rest, moving a window shield, moving a foldable table, or a combination thereof. In some cases, the movement of the virtual seat or the travel avatar is via interaction on the virtual seat with an input device. In some cases, the interaction comprises a touch, a click, a drag, a tap, pointing, pressing, swiping, contouring, a gesture, circling, crossing, highlighting, or a combination thereof. In some cases, the input device comprises a mouse, a keyboard, a pointer, a touch screen, a camera, a microphone, a motion sensor, a sound sensor, a pressure sensor, a temperature sensor, or a combination thereof. In some cases, the media further comprises a software module allowing a traveler to compare the selected seat in a seat map to one or more other seats in the seat map, the seat map comprising text information of the one or more other seat, wherein the text information is not a price, a cabin type, a seat number, or a row number of the one or more seats. In some cases, the media further comprises a software module calculating personality of travel avatar based on data from sources external to said media. In some embodiments, the one or more search criteria include one or more aspects of personal preferences of the traveler, one or more aspects of the personality of traveler, or both. In some cases, the media further comprises a software module allowing the traveler to visually compare the first seat space of the optimal seat with seat spaces of the competing seats in the list. In some embodiments, one of the two or more competing seats has a second cost per unit seat space that is higher than the first cost per unit space and the other has a third cost per unit seat space that is lower than the first cost per unit space.

In yet another aspect, disclosed herein is a computer-implemented method for seat searching, comparison, and selection based on physical characteristics of travelers and usable seat space, the method comprising: allowing, by a computer, a traveler to enter physical information of the traveler and one or more search criteria; calculating, by the computer, a volumetric physical space that the traveler needs based on the physical information; generating, by a computer, a list of seats from a plurality of seats based on the physical information and said search criteria, each of the plurality of seats comprising a seat space, and the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; allowing, by the computer, the traveler visually compare the calculated volumetric physical space of the traveler with seat spaces of a plurality of seats in the list; allowing, by the computer, the traveler to select a seat from the list; generating, by the computer, a travel avatar based on the physical information of the traveler, the travel avatar being three-dimensional; and allowing, by the computer, the traveler to visualize three-dimensional movement of the travel avatar in the selected seat, the traveler represented by the travel avatar and the selected seat represented by a virtual seat. In some instances, the plurality of seats is in a transportation means, an accommodation, or an entertainment facility. In some cases, the plurality of seats is not in a commercial flight. In some cases, the seat space comprises one or more selected from: a total seat space, a seat width, a seat pitch, a seat-back height, a total usable seat space, a usable seat width at a base level, a usable seat width at a shoulder level, a usable seat pitch, an arm-rest width, a distance between bases of seatback cushion in two adjacent rows, and a distance between head-rests in two adjacent rows. In some cases, the physical information of the traveler comprises a height, a shoulder width, a hip width, a leg length, a femur length, a body weight, a body shape, a body mass index, or a combination thereof. In some cases, the one or more search criteria includes a type of a transportation means, an age of the transportation means, duration of transportation, duration of stay, number of connections, departure time, return time, a price range, in-seat power, food, beverage, an in-seat digital display, in-seat entertainment, WI-FI, distance to a lavatory, a review rating, or a combination thereof. In some cases, the one or more search criteria are weighted based on one or more of the traveler's preference. In some cases, the review rating is from a second traveler that has similar physical information as the traveler. In some cases, the volumetric physical space that the traveler needs comprises a shoulder width, a hip width, a leg length, or a combination thereof. In some cases, the volumetric physical space of the traveler is distinguished to the seat spaces at least by color. In some cases, the visual comparison comprises graphical information and text information. In some cases, the travel avatar has a first scaling from the physical information of the traveler and the virtual seat has a second scaling from the seat space of the selected seat, the first scaling and the second scaling being three dimensional and equal to each other. In some cases, the travel avatar and the virtual seat are color-coded such that a first area of the travel avatar is in a same color as a second area of the virtual seat that the first area moves with. In some cases, the three-dimensional movement of the travel avatar in the selected seat is passive and caused by movement of the virtual seat in three-dimensions. In some cases, the three-dimensional movement of the travel avatar in the selected seat is active and not caused by movement of the virtual seat in three-dimensions. In some cases, the method further comprises allowing a traveler to move the virtual seat thereby causing the travel avatar to move passively along with the virtual seat in three-dimensions, or the travel avatar in three-dimensions when the virtual seat remains static. In some cases, the movement of the virtual seat comprises change a pitch of the virtual seat, moving the arm-rest, moving a window shield, moving a foldable table, or a combination thereof. In some cases, the movement of the virtual seat or the travel avatar is via interaction on the virtual seat with an input device. In some cases, the interaction comprises a touch, a click, a drag, a tap, pointing, pressing, swiping, contouring, a gesture, circling, crossing, highlighting, or a combination thereof. In some cases, the input device comprises a mouse, a keyboard, a pointer, a touch screen, a camera, a microphone, a motion sensor, a sound sensor, a pressure sensor, a temperature sensor, or a combination thereof. In some cases, the method further comprises allowing a traveler to compare the selected seat in a seat map to one or more other seats in the seat map, the seat map comprising text information of the one or more other seat, wherein the text information is not a price, a cabin type, a seat number, or a row number of the one or more seats. In some cases, the method further comprises calculating personality of travel avatar based on data from sources external to said method. In some embodiments, the one or more search criteria include one or more aspects of personal preferences of the traveler, one or more aspects of the personality of traveler, or both. In some cases, the method further comprises allowing the traveler to visually compare the first seat space of the optimal seat with seat spaces of the competing seats in the list. In some embodiments, one of the two or more competing seats has a second cost per unit seat space that is higher than the first cost per unit space and the other has a third cost per unit seat space that is lower than the first cost per unit space.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 6 shows a non-limiting exemplary embodiment of a travel avatar of the system, method, and media as disclosed herein.

FIG. 7 shows a non-limiting exemplary embodiment of a bar graph generated and/or used in the system, method, and media as disclosed herein for comparison of usable seat spaces of flight seats or comparison of usable seat spaces of flight seats to volumetric physical space of the traveler.

FIG. 8 shows another non-limiting exemplary embodiment of a ranked list of search results generated based on the traveler's physical characteristics, preferences, and/or other search criteria using the system, method, and media as disclosed herein.

DETAILED DESCRIPTION OF THE INVENTION

Figure 1:
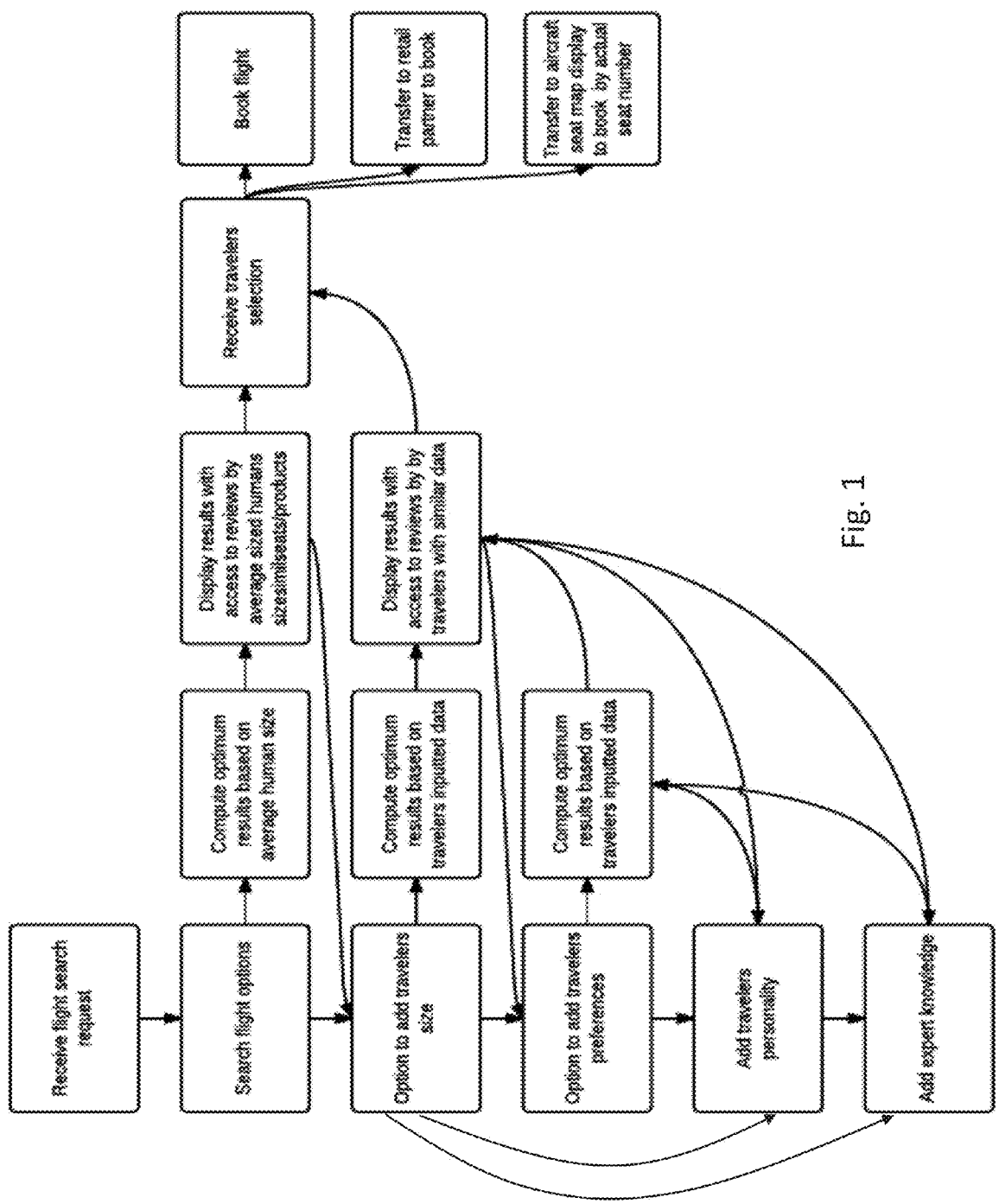
FIG. 1 shows a flow diagram for a process of searching, comparing, and selecting flight(s) using an exemplary embodiment of the system, method, and media as disclosed herein.

Existing systems and methods that generate flight search results primarily use a combination of flight time, connections, and cost for the flights. There is no known system or method that compares and differentiate commercial flight and flight seats based on a traveler's physical characteristics and the usable space of flight seat in which the traveler will fly. Existing systems and methods that provide information of the size of a seat, for example, a flight seat, to travelers are limited to cabin types or airline-generated dimensions. This is a one-size-fits-all approach, and it fails to take any consideration of the different physical size of travelers, which may vary vastly from one individual to another. Further, the airline-generated dimensions can be misleading and irrelevant to the true size. For examples, a certain industry standard for airplane seat width is the distance between the armrests. Changes to the armrests width change the measured seat width, but it does not provide extra seat space to the passenger. Furthermore, certain airline-generated measurements are not easily understandable for travelers, for example, the pitch of a seat. Thus, the traveler will have difficulties in linking these measurements to the level of comfort they can achieve while sitting, working, or resting in the flight seat. Yet further, opinions regarding inflight experience by a small group of travelers can be subjective and may not be applicable to other passengers with different preferences. Thus, there is a demand for searches, comparisons, and differentiations of commercial flights based on the cost of the flight with the usable space and comfort provided at that cost. It is also desirable for a traveler to visualize the seating experiences in different flight seats and the comparison of various flight seats.

The systems, methods, and media disclosed herein advantageously provides the capability for searching, comparing, differentiating, and optionally retailing commercial flight seats based upon a traveler's physical measurements, the usable space of the aircraft seat, the cost, and optionally in combination with the traveler's other personal preferences, personality, and the opinions of travelers that may have similar physical measurements and/or preferences. The systems, methods, and media disclosed herein advantageously enable the traveler to make a more informed decision when choosing a flight. The systems, methods, and media disclosed herein may produce an optimal seat result for a specific traveler based on the input of the user's physical information and additionally with preferences of cost, space, and other aspects. By producing an optimal seat, the systems, methods, and media enable the traveler to scroll a list of results in either direction away from the optimum seat to find cheaper but less comfortable seats or in the opposite direction, to find more comfortable and expensive seats. In addition, the systems, methods, and media disclosed herein allow direct, simple, and convenient visual comparison of the physical volumetric size of the traveler with seat spaces of a plurality of seats in the list of results. As an example, the visual comparison may include bar graph indicative not only of the comparison of total space of the passenger and seat(s), but also of other detailed measurements including but not limited to shoulder width, arm-rest width, and/or pitch. The bars may be in two-dimensions or three dimensions. Further, the systems, methods, and media disclosed herein additionally provide a three-dimensional interactive visualization of the passenger sitting in the optimal seat or any other seats of choice. A traveler's avatar can be placed in the selected flight seat in two dimensional and/or three-dimensional virtual space and the avatar may move in the seat passively with the seat adjustment or actively while the seat stays still. Such visualization provides comprehensive, direct, convenient, and easy-to-understand information regarding a flight seat that cannot be readily obtained in any existing flight seat selection or differentiation tools. Furthermore, the systems, methods, and media disclosed herein has the advantageous of providing complementary text or color coding that may be used to provide information that has not been included in the graphical information. Such complementary information may be related to location, environment, comfort, or other aspects of the seat.

In one aspect, the systems, methods, and media disclosed herein includes a computer-implemented system for flight seat searching, comparison, and selection based on physical characteristics of travelers and usable flight seat space, the system comprising: a digital processing device comprising an operating system configured to perform executable instructions and a memory; a database of a plurality of seats, each of the plurality of seats comprising a seat space; and a computer program including instructions executable by the digital processing device to create a flight seat searching, comparison, and selection application comprising: a software module allowing a traveler to enter physical information of the traveler and one or more search criteria; a software module calculating a volumetric physical space that the traveler needs based on the physical information; a software module generating a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; a software module allowing the traveler to visually compare the calculated volumetric physical space of the traveler with seat spaces of a plurality of seats in the list; a software module allowing the traveler to select a seat from the list; a software module generating a travel avatar based on the physical information of the traveler, the travel avatar being three-dimensional; and a software module allowing the traveler to visualize three-dimensional movement of the travel avatar in the selected seat, the traveler represented by the travel avatar and the selected seat represented by a virtual seat.

In another aspect, disclosed herein includes non-transitory computer-readable storage media encoded with a computer program including instructions executable by a processor to create a flight seat searching, comparison, and selection application based on physical characteristics of travelers and usable flight seat space comprising: a database, in a computer memory, of a plurality of seats, each of the plurality of seats comprising a seat space; a software module allowing a traveler to enter physical information of the traveler and one or more search criteria; a software module calculating a volumetric physical space that the traveler needs based on the physical information; a software module generating a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; a software module allowing the traveler to visually compare the calculated volumetric physical space of the traveler with seat spaces of a plurality of seats in the list; a software module allowing the traveler to select a seat from the list; a software module generating a travel avatar based on the physical information of the traveler, the travel avatar being three-dimensional; and a software module allowing the traveler to visualize three-dimensional movement of the travel avatar in the selected seat, the traveler represented by the travel avatar and the selected seat represented by a virtual seat.

In yet another aspect, disclosed herein is a computer-implemented method for flight seat searching, comparison, and selection based on physical characteristics of travelers and usable flight seat space, the method comprising: allowing, by a computer, a traveler to enter physical information of the traveler and one or more search criteria; calculating, by the computer, a volumetric physical space that the traveler needs based on the physical information; generating, by a computer, a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; allowing, by the computer, the traveler to visually compare the calculated volumetric physical space of the traveler with seat spaces of a plurality of seats in the list; allowing, by the computer, the traveler to select a seat from the list; generating, by the computer, a travel avatar based on the physical information of the traveler, the travel avatar being three-dimensional; and allowing, by the computer, the traveler to visualize three-dimensional movement of the travel avatar in the selected seat, the traveler represented by the travel avatar and the selected seat represented by a virtual seat.

In an alternative aspect, disclosed herein is a computer-implemented system for seat searching, comparison, and selection based on physical characteristics of travelers and usable seat space, the system comprising: a digital processing device comprising an operating system configured to perform executable instructions and a memory; a database of a plurality of seats, each of the plurality of seats comprising a seat space; and a computer program including instructions executable by the digital processing device to create a seat searching, comparison, and selection application comprising: a software module allowing a traveler to enter physical information of the traveler and one or more search criteria; a software module calculating a volumetric physical space that the traveler needs based on the physical information; a software module generating a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; a software module allowing the traveler to visually compare the calculated volumetric physical space of the traveler with seat spaces of a plurality of seats in the list; a software module allowing the traveler to select a seat from the list; a software module that generates a travel avatar based on the physical information of the traveler, the travel avatar being three-dimensional; and a software module allowing the traveler to visualize three-dimensional movement of the travel avatar in the selected seat, the traveler represented by the travel avatar and the selected seat represented by a virtual seat.

In yet another aspect, disclosed herein is non-transitory computer-readable storage media encoded with a computer program including instructions executable by a processor to create a seat searching, comparison, and selection application based on physical characteristics of travelers and usable seat space comprising: a database, in a computer memory, of a plurality of seats, each of the plurality of seats comprising a seat space; a software module allowing a traveler to enter physical information of the traveler and one or more search criteria; a software module calculating a volumetric physical space that the traveler needs based on the physical information; a software module generating a list of seats from the plurality of seats based on the physical information and said search criteria, the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; a software module allowing the traveler to visually compare the calculated volumetric physical space of the traveler with seat spaces of a plurality of seats in the list; a software module allowing the traveler to select a seat from the list; a software module that generates a travel avatar based on the physical information of the traveler, the travel avatar being three-dimensional; and a software module that allowing the traveler to visualize three-dimensional movement of the travel avatar in the selected seat, the traveler represented by the travel avatar and the selected seat represented by a virtual seat.

In yet another aspect, disclosed herein is a computer-implemented method for seat searching, comparison, and selection based on physical characteristics of travelers and usable seat space, the method comprising: allowing, by a computer, a traveler to enter physical information of the traveler and one or more search criteria; calculating, by the computer, a volumetric physical space that the traveler needs based on the physical information; generating, by a computer, a list of seats from a plurality of seats based on the physical information and said search criteria, each of the plurality of seats comprising a seat space, and the list comprising: an optimal seat, the optimal seat comprising a first seat space, the optimal seat having a first cost per unit seat space in the list; and two or more competing seats, wherein one of the two or more competing seats has a second seat space that is greater than the first seat space, while the other has a third seat space that is smaller than the first seat space; allowing, by the computer, the traveler visually compare the calculated volumetric physical space of the traveler with seat spaces of a plurality of seats in the list; allowing, by the computer, the traveler to select a seat from the list; generating, by the computer, a travel avatar based on the physical information of the traveler, the travel avatar being three-dimensional; and allowing, by the computer, the traveler to visualize three-dimensional movement of the travel avatar in the selected seat, the traveler represented by the travel avatar and the selected seat represented by a virtual seat.

Certain Terms

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Referring to FIG. 1, in a particular embodiment, an exemplary flow-chart of how the systems, methods, and media disclosed herein provides a traveler the capability for searching, comparing, differentiating, and booking commercial flight seat(s) based on traveler(s)'s physical information and other search criteria, optionally with personal preferences of amenities and personalities. Optionally, the system receives a flight search request from a user and allows the user to enter flight search options. The flight search options, in some cases, include regular search criteria such as the origin and destination airports, dates, class of travel, number and type of travelers, and specific information, for example, number of tall traveler(s). The system optionally searches and computes search results based on average human size based on the search options provided, and displays the results to the user. Alternatively, the user can select to enter additional data of the traveler, such as physical information of travelers, a new set of results can be generated based on the search criteria and the additional physical information provide. Further, the user can select to enter further information of personal preferences of the traveler of the traveler for the system to generate another new set of search results to be visualized by the user. As examples, personal preferences may include but not limited to range of cost, comfort, schedule, child friendly, free WI-FI, in-time performance, food service, or the like. Yet further, the user can additionally enter personality traits through various means and add the personality data for generating a new set of search results. The user optionally selects to add expert review or knowledge data for generating new search results. In some cases, the search results are provided with reviews for the similar flights taken by other travelers with similar search options, preferences, personality, or their combinations. The traveler after reviewing the search results optionally books the selected flight(s) using the system, method, or media disclosed herein. In alternative case, the user is linked to retailer to book the selected flight(s). Optionally, the user can view the actual seat map to book by actual seat number.

Seats

In some embodiments, the systems, methods, and media disclosed herein include a seat of a commercial flight, passenger flight, airplane, or aircraft. In further embodiments, the seats may be any cabin type that is available for purchase. In alternative instances, the systems, methods, and media disclosed herein include a seat in a transportation means, entrainment facility, and/or beds in an accommodation. As disclosed herein, a seat is not limited to a commercial flight seat but may represent a seat, a bed, a coach, or any other similar product. By way of examples, the seat disclosed herein may be a hotel bed, a bus seat, a train seat, a bed in a cruise cabin, a seat in a rental car, a theatre seat, a seat in a stadium, or any other commercially available seat, bed, or product of the like. In some cases, a seat as disclosed herein may include a group of seats, a group of beds, or a group of other products for a group of travelers.

The systems, methods, and media disclosed herein can also enable client searching of multiple seats for more than one traveler. Multiple travelers in a single party could also benefit from the seating comparison showing the best options of who should seat next to whom to maximize comfort of the whole party. Specifically, families traveling with children could also optimize comfort from comparing numerous options with regard to the family sitting together and sharing space to the comfort of all members.

As an example, the user may conduct a search for rental cars even in the same category, i.e., compact cars, to compare size of the driver's seats optionally in combination with the size of passenger seats, and the size and space for luggage to select an optimal car for a desired price for all the travelers.

Seat Spaces

The seats, beds, or similar products as disclosed herein include a seat space. In some cases, the seat space is the available or usable seat space by the user. In other cases, the seat space is the total seat space that can be measured. The total seat space may be misleading as it may be altered without change in the usable space. As an example, a seat width may remain the same but the total space may increase with a narrower arm-rest. As another example, the total space of two seats may be the same whereas one seat may not have enough room for reclining as it is the last row in the cabin.

The usable seat space is usually smaller than the total seat space and it is the preferred measurement as it is more indicative of comfort for the passenger who travels therein. In some cases, the usable seat space is calculated based on the total seat space and other information available regarding the seat and its surroundings. In some cases, the usable seat space is directly measured at the seat or similar seats in the same type of aircraft (i.e., make, model, year, etc.). In some cases, a usable seat space and other related information is measured through a traveler's wearing of a measuring device.

The seat space measurements and other information may be stored in a database of the system, method, and/or media as disclosed herein, retrievable based on aircraft type, flight number, seat number, row number, cabin type, or other information related to a flight seat search.

In some cases, the seat space includes one or more including but not limited to a total seat space (including or excluding the volume of the seat itself), a seat volume (of the seat itself), a total usable seat space by the user, a usable seat width at a base level of the seatback, a usable seat width at a shoulder level of the user or of the seatback, a usable seat pitch, a seat pitch, a seatback height, a head-pillow size, a maximal seat recline angle, a shoulder width, a seat width, an arm-rest width, a contour of the overhead cabin, a height from the seat to the overhead cabin, a seatback thickness, a leg space, a distance between bases (at the center of the seatback) of seatback cushion in two adjacent rows, a distance between head-rests in two adjacent rows, or the like.

Figure 2:
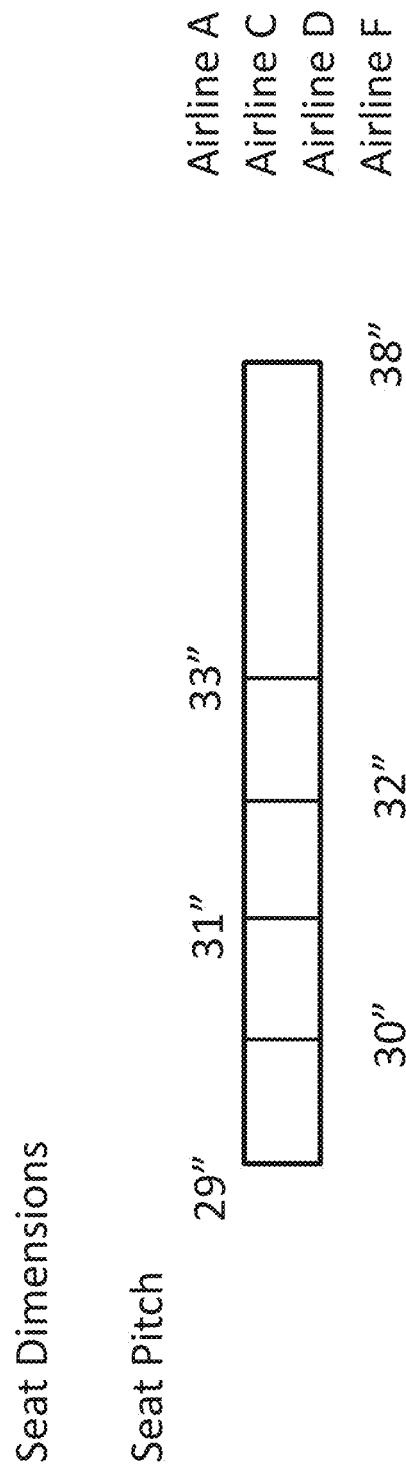
FIG. 2 shows a non-limiting exemplary embodiment of a search interface of the system, method, and media disclosed herein that allows a user to select usable seat space thereby ranking commercial airlines by their usable seat spaces.

In some cases, one or more aspects of a seat space of a commercial airline are stored in the databases. In some cases, as the user select a range of seat space, commercial airlines within the range of selection is shown while the others outside the range are removed from display and/or search results. Referring to FIG. 2, in a particular embodiment, as the traveler selects a range of seat pitch using the slider bar, the airlines satisfying the seat pitch requirement of the user are optionally shown in a list. The list is optionally ranked with the greatest seat space with the range on the top while the smallest seat space within that range at the bottom.

In further cases, the seat space includes other derived or calculated parameters using one or more aspects as described herein, these parameters are useful for selecting a seat. For example, the seat space may include derived parameters such cost per unit seat space, a ratio of usable space and total space, a percentage of physical space of the traveler to the total usable space of a seat, etc. In an exemplary embodiment, an economy cabin seat of 860 liters of usable space may cost $87.2 cents per liter of space with 38 inches of seat pitch, while another seat in the same cabin may provide 795 liters of space costing 89.2 cents per liter of space with 35 inches of pitch.

In other cases, effect of a seat space, for examples, usable space, on a traveler, is measured through a traveler's wearing of a health measuring device which provides parameters relative to the traveler's physiological conditions or health performance of the passenger. As an example, a lower-pack pressure, edema in lower legs, blood pressure, body temperature, or the like, may be measured or monitored continuously or at discrete time points while the traveler is seating in the flight.

In some cases, a seat space may include a total seat space of more than one seat that a group of traveler is going to travel in. Similarly, a usable seat space may include a total usable seat space of more than one seat that a group of traveler is going to travel in. Similarly, parameters derived or calculated from seat space, such as cost per unit seat space, may include be calculated based on more than one seat that a group of traveler is going to travel in.

Searching

In some embodiments, the systems, methods, and media disclosed herein may allow a user to search for one or more flight seat or other products using the physical information of at least one traveler and one or more search criteria. In some cases, the search criteria include physical information of the traveler. In some cases, the search criteria indicate criteria that do not include or related to physical information of the traveler. In some cases, the search criteria include preference(s) of the traveler. In some cases, the search criteria indicate criteria that do not include or related to preference(s) of the traveler.

In some cases, the search criteria include information of seat space(s). In some cases, the search criteria include parameters derived based on information of the seat space(s). As an example, the search criteria may include a seat pitch of no less than 37 inches. As another example, the search requires the seat to have a usable space of greater than 800 liters with a maximal recline angle of 60 degrees. In some cases, the search criteria include that the seat(s) is viewable in three-dimensional virtual display reflecting the actual seat(s).

Figure 5:
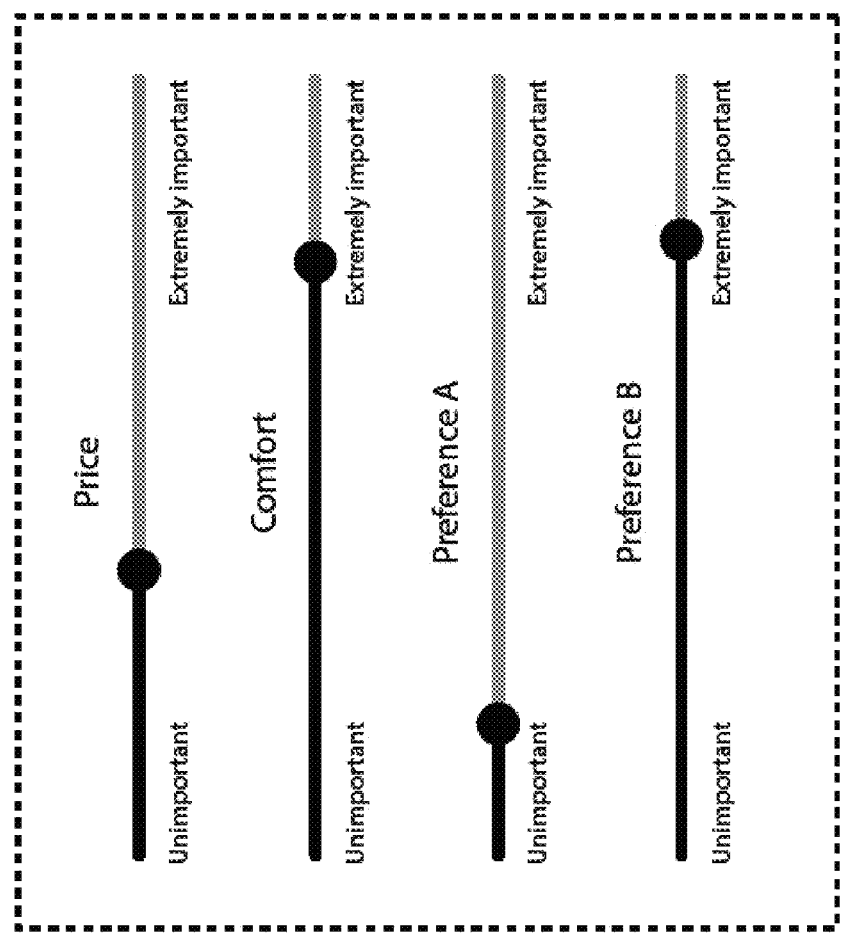
FIG. 5 shows another non-limiting exemplary embodiment of a search interface of system, method, and media as disclosed herein that allows a user to enter personal preference(s) of a traveler for a flight search.

In some cases, the search criteria include one or more preferences of the user of amenities and/or features associated with the seat. In further cases, the one or more preferences may be weighted based on the traveler's input. In yet further cases, the one or more preference may be weighted based on user interaction with an input device. Referring to FIG. 5, in a particular embodiment, a user optionally select importance of comfort in his/her flight seat searches by sliding a bar from left, labeled as unimportant, to right, labeled as extremely important. Other personal preferences such as cost, amenity, schedule, transfer time, or the like may also be selected using the same interface as shown in FIG. 5. In some exemplary embodiments, a user can select one or more seat preferences by checking different boxes on the same page or on a different page for entering the physical information of traveler(s). If any seat preferences are selected, the search results optionally reflect the selected preferences. For example, if a user consider WI-FI as extremely important or checked the box for WI-FI, the search engine will firstly only search flight seats that provide WI-FI in addition to other search criteria that the user may have entered. If no flight seats can be found that provides WI-FI as well as satisfying other search criteria, the search engine will either ask the user to refine search or provide search results that are most relevant to the search criteria entered.

In alternative cases, the search criteria include one or more aspects of the personalities of the traveler or the travel avatar. In further cases, such personalities may be extracted from sources external to the systems, methods, media disclosed herein. In some exemplary embodiments, some personalities may be obtained from social networking websites, weblogs, such as Facebook, Twitter, LinkedIn, Instagram, or the like. For examples, a traveler may be determined as a light-sleeper or a person who prefers quite environment based on his or her microblog. Thus, such information can be combined with other search criteria and preference(s) to generate the search results. As such, the search can prioritize flight seats that are less disturbed by neighbors and/or traffics on the aisles. In further cases, the one or more personalities may be weighted based on the traveler's input. In alternative cases, the one or more personalities may be weighted automatically by the system/method/media disclosed herein.

Other search criteria may include but are not limited to seat location in the cabin, distance to a toilet, distance to a window/aisle, distance to an exit row or a last row of the cabin, WI-FI, distance to a lavatory, power outlet, or the like.

In some cases, one or more of the search criteria, physical information of the traveler, preference(s) of the traveler, and/or personalities of the traveler are weighted. The weighting is used to generate a ranked list of search results so that different factors are given customized weight or weight based on empirically data of the system/method/media.

Figure 3:
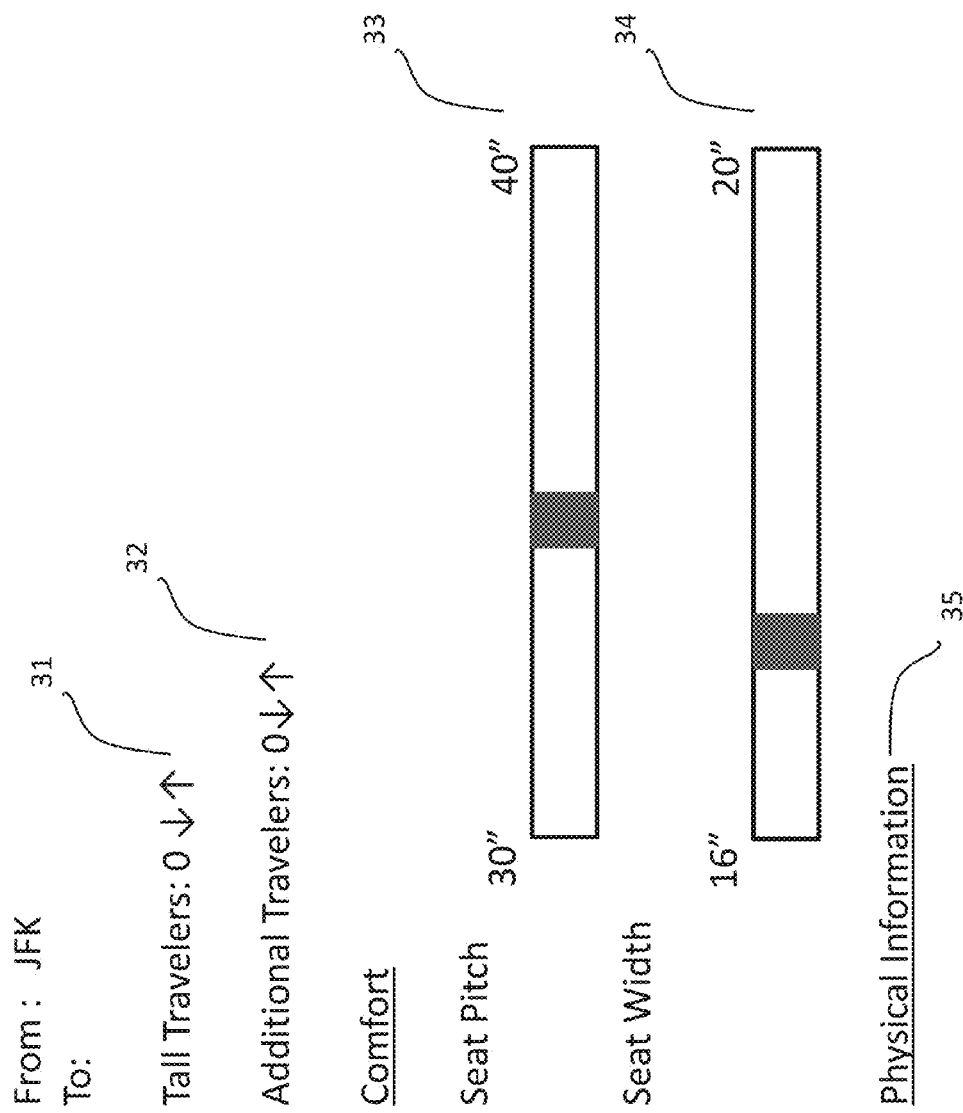
FIG. 3 shows another non-limiting exemplary embodiment of a search interface of system, method, and media as disclosed herein that allows a user to enter search criteria and preferences of seat spaces and/or amenities for a flight search.

In some embodiments, the systems, methods, and media disclosed herein provide a search interface. Referring to FIG. 3, in an exemplary embodiment, the search interface allows input of user-selected search options. As in traditional flight searches, the user enters necessary information needed to initiate a search, such information may include traveling dates, origin, destination, and one-way or round trip, and/or other the search criteria. Differently from the traditional flight searches, optionally, the user enters physical information of the traveler(s). For examples, the user enters the number of tall travelers 31 and the number of additional travelers 32. Further physical information can be entered either on the existing page or on a different page, optionally using the "Physical Information" tab/link 35. Such input of information by the user may be via interaction with an input device. Optionally, the user select or exclude a range of seat pitch using a slider bar 33 or another interactive tool, similarly, the user can add seat widths 34 as a search option.

In some cases, the interface may include a scroll bar, a slider bar, a wheel, arrow keys, or the like for user-selection of various search criteria. As shown in FIG. 3, in an exemplary embodiment, a slider bar of seat pitch varying from 30 inches to 40 inches is included together with a scroll bar of seat width from 16 inches to 20 inches.

Further, the search interface may optionally allow a user to save at least part of the input at the search interface to transfer to a new search subsequent to the current search. In further cases, the new search is in the same trip but for searching a product different than a flight seat. Such propagation allows fast extraction of the users physical information, preferences, and/or other searching criteria to a new search therefore improves efficiency and convenience in conducting different searches for the same traveler(s).

As disclosed herein, in some embodiments, the physical information and the other search criteria may be weighted at the users' selection in order to generate optimal search results for the user. A weighting may be assigned automatically based on empirically determined value to one or more search criteria and/or one or more parameters of the physical information of the users. Alternatively, the user may alter one or more weighting to a customized value. In some cases, the total value of all the weightings adds up to predetermined value, which can be fixed. In further cases, the total weighting is 1.

Physical Information

In some embodiments, the systems, methods, and media disclosed herein allow a user to enter physical information of one or more travelers that is going to be selecting a flight seat or similar products. In some cases, the user directly enters physical information of the traveler(s). In other cases, the user enters information that can be used to derive physical information of the traveler(s). For examples, the user can enter his or her T-shirt size, bottom size, in-seam, shoe size, hat size, or the like, instead of directly entry of height, weight, etc. In alternative embodiments, the systems, methods, and media disclosed herein obtain physical information of traveler(s) in various ways other than direct input from a user. Such various ways may include scanning of a document containing physical information, extracting data from online data sources, or measurement of physical information using appropriate probes, or the like. In further instances, the physical information obtained may be calculated, processed, and/or recorded to derive physical characteristics of the traveler(s).

The physical information and/or characteristics may include but not limited to one or more selected from: race, age, gender, blood type, body shape, body type, body build, top size, bottom size, shoe size, hat size, height, arm-span, weight, BMI, waist size, inseam, shoulder width, hip width, chest size, a medical record, a disease history, a physiological or pathological condition, or the like. For examples, the user may select to enter if any traveler(s) has any physical disability.

For certain cases, the physical information is saved in the systems, methods, and media such that such information may be automatically saved for any searches/selections subsequent the current search/comparison/selection. For various instances, the physical information is transferred to search, comparison, and/or selection that is (are) concurrent with or subsequent to the current search, comparison, and/or selection. For examples, the physical information used in searching a flight seat may be automatically transferred to a hotel room search or a rental car search for the same trip.

In an exemplary embodiment, the search interface allows input of physical information of the traveler(s) using the pull-down box. Afterwards, the user optionally gets directed to an expanded view as shown in FIG. 4 for entering personal information.

Figure 4:
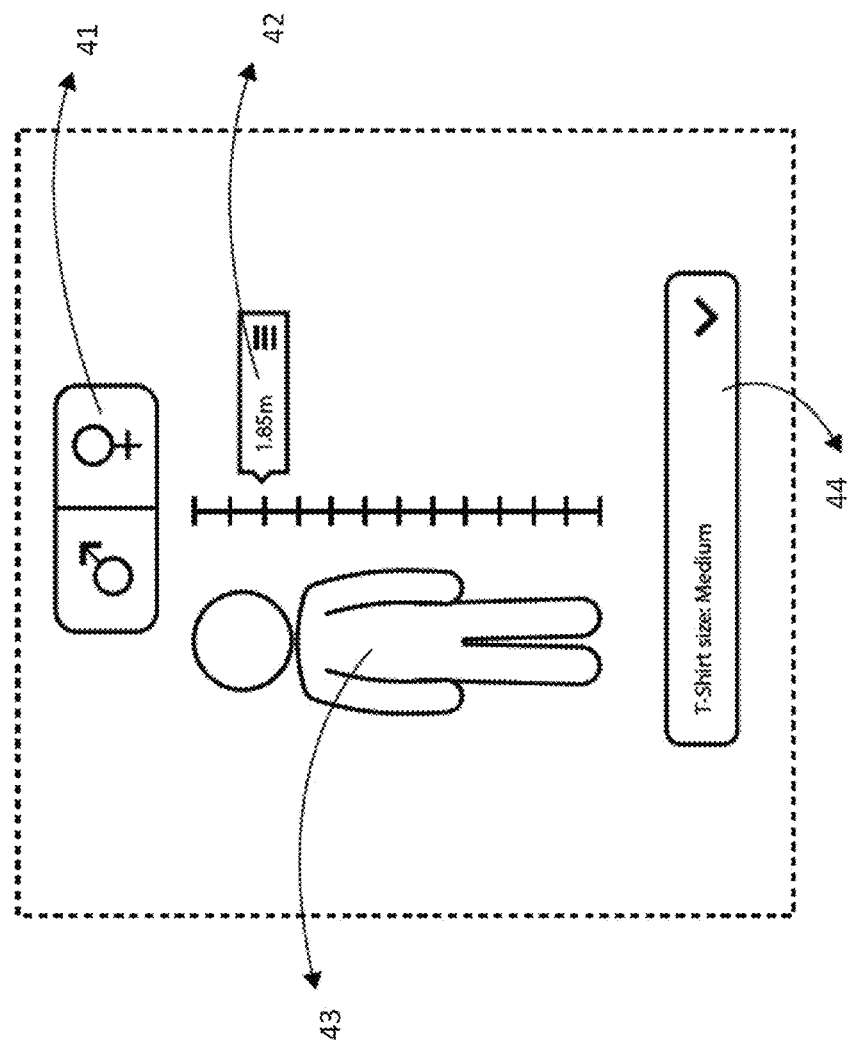
FIG. 4 shows another non-limiting exemplary embodiment of a search interface of system, method, and media as disclosed herein that allows a user to enter physical information of a traveler for a flight search.
Figure 10:
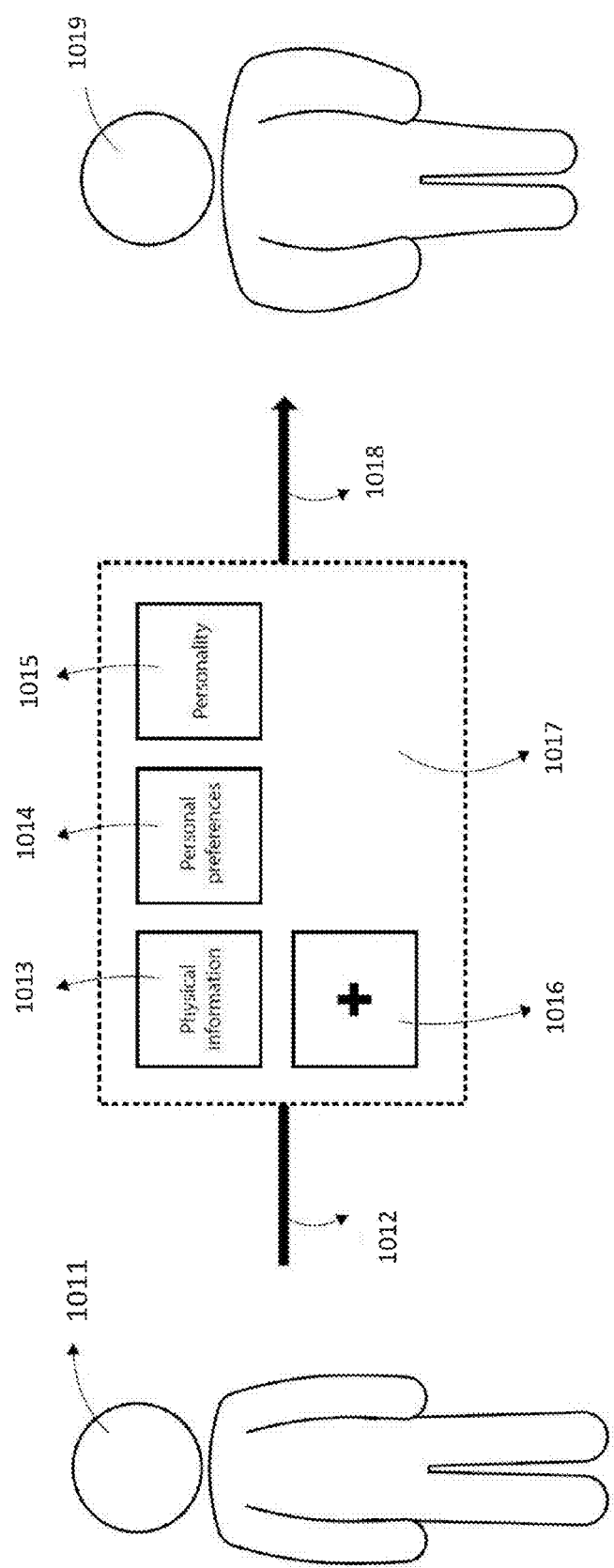
FIG. 10 shows a non-limiting exemplary embodiment of a personalized travel avatar of the system, method, and media as disclosed herein.

Referring to FIG. 4, in this particular embodiment, a user can enter height 42, weight, gender 41, and physical size 44 for each traveler. The traveler's size 44 may be different for travelers from different regions or countries. The avatar 43 representing traveler may change its dimensions in real time to reflect entries of the physical information. Optionally, as shown in FIG. 10, a two dimensional or three-dimensional image 1019 may appear to reflect changes a user makes to the height, weight, and gender in order to assist the user's input of information. The user optionally adds his/her image to his/her personal information. In some cases, the image may be an image of the face or the full-body of the traveler.

In some cases, disclosed herein is a software module calculating a volumetric physical space that the traveler needs based on the physical information. In some cases, the volumetric physical space is a calculated number, an estimated number, a range, or the like. In further cases, the volumetric physical space is the minimal volume or space that the traveler occupies. In some cases, the volumetric physical space is a range of volume or space expanding from the minimal space that the traveler occupies to a predetermined volume or space. In alternative cases, the volumetric physical space is an average space estimated statistically, especially when the traveler does not provide any or minimal physical information. In other cases, the volumetric physical space is the minimal volume or space with an additional space that will make the traveler feel comfortable, for examples, another 1%-10% of extra space of the minimum.

In some embodiments, the systems, methods, and media disclosed herein allow calculation of a volumetric physical space that the traveler needs based on the physical information. In further cases, the volumetric physical space is used for comparison to the usable space of seat(s). In alternative cases, the volumetric physical space is used for calculating a three-dimensional travel avatar. In some cases, the volumetric physical space is a quantitative number indicative of a volume of physical space. In further cases, the volumetric physical space includes a specific three-dimensional size and shape reflecting the physical information of the user. In some case, the volumetric physical space includes one or more selected from: height, a shoulder width, a chest size, a waist size, a leg length, a hip width, a bust size, a BMI, or the like that is similar to the physical information of user.

Search Results

In some cases, the systems, methods, and media disclosed herein may generate a search result based on the physical information and the search criteria provided. In some cases, the search results are generated using commercially available search engines, algorithms, or tools. In other cases, the search results are generated using search engines modified from currently available search tools.

The search result may include a ranked list of flight seats or other products of the like. The ranking of the flight seats in the list is based on the physical information of the user, in some cases. In alternative cases, the ranking is based on one or more search criteria in combination with one or more of the physical information, the preference(s), and the personalities. In further cases, the ranking is based on weight(s) of one or more search criteria in combination with one or more of the physical information, the preference(s), and the personalities. For example, the list may be ranked such that the seat with larger usable seat space ranks higher than seat with smaller usable space. As another example, the list may be ranked such that the seat with less expensive unit usable space ranks higher than seat with more expensive unit usable space. As yet another example, the list may be ranked such that seats having space(s) equal or greater than the volumetric physical space that the traveler needs rank higher than other seats, and further, among these seats, the seat that has the lowest price per unit space optionally ranks highest.

The ranked list may include at least three different flight seats. One of the three flight seats, in some cases, is the optimal seat that the system-recommends to the user based on the search. In some cases, the optimal seat is any seat that meets all the search requirements, including space, preference(s), etc, that has been used. In some cases, if there is more than one seat that meets all search requirements, the optimal seat is optionally the seat that best meets all the search requirements than any other seats in the ranked list. In some cases, the search requirements includes but are not limited to regular search criteria, seat space, personal preferences of the traveler, and personalities of the traveler. In cases when no seat meets all search criteria that the user entered, the optimal seat is the closest to meeting all the search criteria. In some cases, the optimal seat has at least one feature that better satisfies one or more search requirements than at least one other seat in the list. For examples, the optimal seat has a seat space that is comparable to the calculated volumetric physical space of the user. In yet further cases, the usable seat space of the optimal seat is about less than 10% different from the volumetric physical space of the user.

In addition, the ranked list includes at least two or more competing seats. In some cases, the two or more competing seat has one or more features that are different from the optimal seat, the feature(s) included in but not limited to the regular search criteria, seat space information, preference(s), and/or personalities. In some embodiments, one or both of the competing seats includes a difference in feature(s) from the optimal seat. In further embodiments, differences between two competing seats and the optimal seat are in opposite directions. In further cases, the difference are may be any parameters or aspects disclosed herein related to seat space, amenity, or the like. As an example, one competing seat may be less expensive than the optimal seat; the other may be more expensive than the optimal seat. As another example, in some instances, one competing seat may provide more usable seat space, pitch, or inclination than the optimal seat, while the other may provide less than the optimal seat. As yet another example, in some cases, one competing seat provides in-seat screen while the other competing seat does not provide in-seat screen. Such provision of two competing seats in the search results preferably considering features in opposite directions each other and optionally from the optimal seat may advantageously provide the user with more flexibility and more diversity to go in two opposite directions from the optimal seat for the final selection of a flight seat. The search results with two competing seats, preferably in opposite directions, especially enables flexibility in selection when the user provides limited information in search requirements.

As the list is ranked, all the seats in the list are ordered by their ranks, preferably from the highest to the lowest rank. In some cases, the optimal seat has at least one competing seat that has a higher rank than it, and at least one other competing seat that has a lower rank than it in the list. The user may go in both directions from and away from the optimal seat to view other seats in the list. In different exemplary embodiments, the two or more competing seats are in the ranked list such that two or more are ranked lower than the optimal seat.

The list of seats generated as the search results as disclosed herein renders flexibility in selection and provides useful information for additional and more-oriented comparison of seats that best suits the user's needs.

For some instances, each seat or entry in the list includes information reflecting one or more search criteria, preferences, and/or personalities and/or one or more parameters of the space of the seat.

Such information of each entry/seat may be visualized as text information, two-dimensional graphical information, three-dimensional graphical information, interactive graphical information, color information, or the like, as shown in FIGS. 8, 9A-B, and 11-12. In some cases, the text information does not include conventional information such as a flight number, a ticket price, a cabin type, a seat number, or a row number of seat(s). In some cases, the text information may include at least some information related to the parameters of seat space and/or information derived from the seat space. In some cases, the text information may include information related to preference(s), personalities of the traveler, optionally being used in the flight search. For example, the text information may include seat cost per liter of space 1105 and the usable seat space as elements 1107-1109 shown in FIG. 11. As another examples, "waste space" may be labeled and pointed to graphical portion that indicate excessive space that a user might need in a seat, as shown in FIG. 7.

Figure 9A:
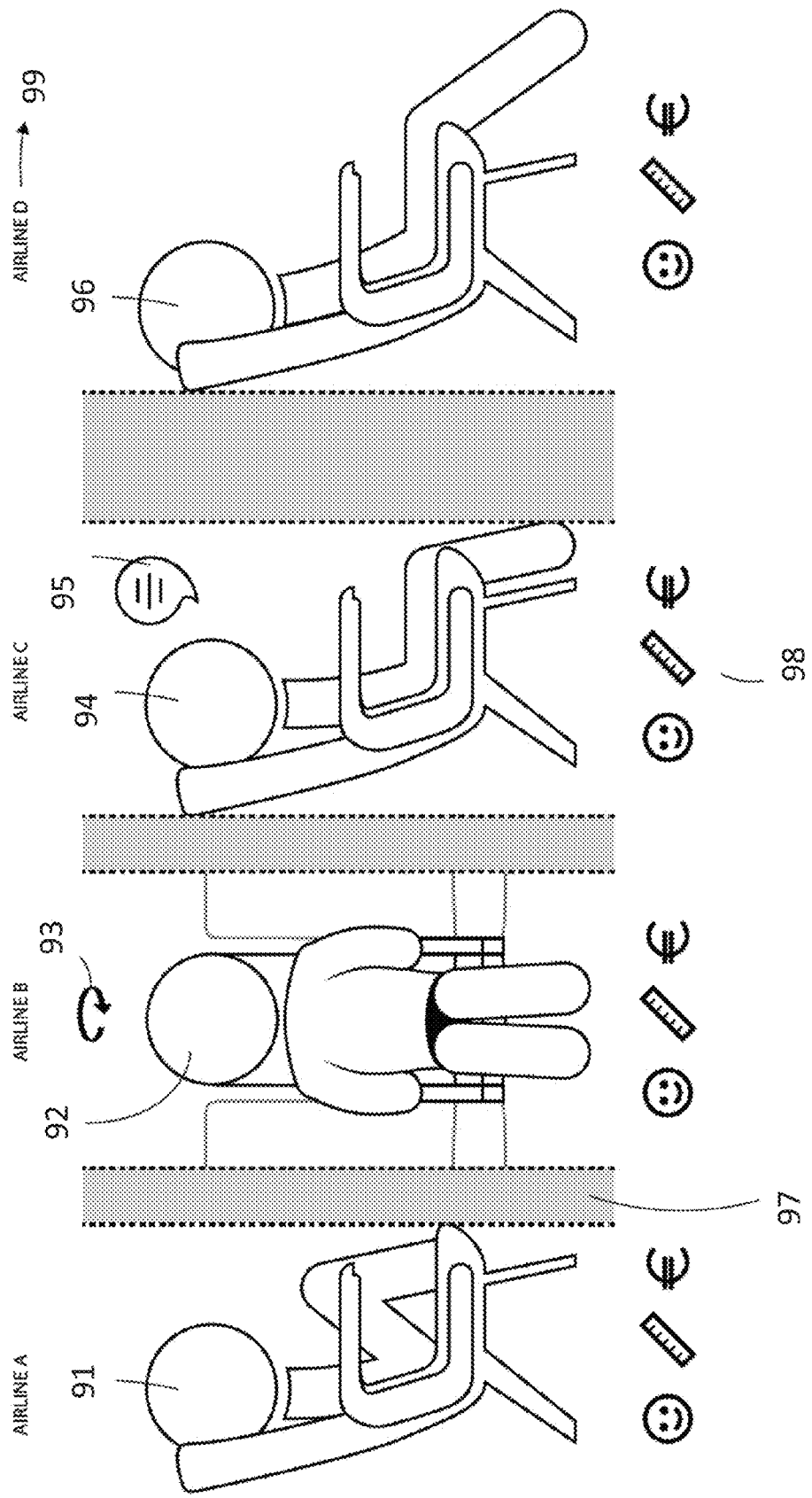
FIG. 9A shows another non-limiting exemplary embodiment of a ranked list of search results generated based on the traveler's physical characteristics, preferences, and/or other search criteria using the system, method, and media as disclosed herein.
Figure 9B:
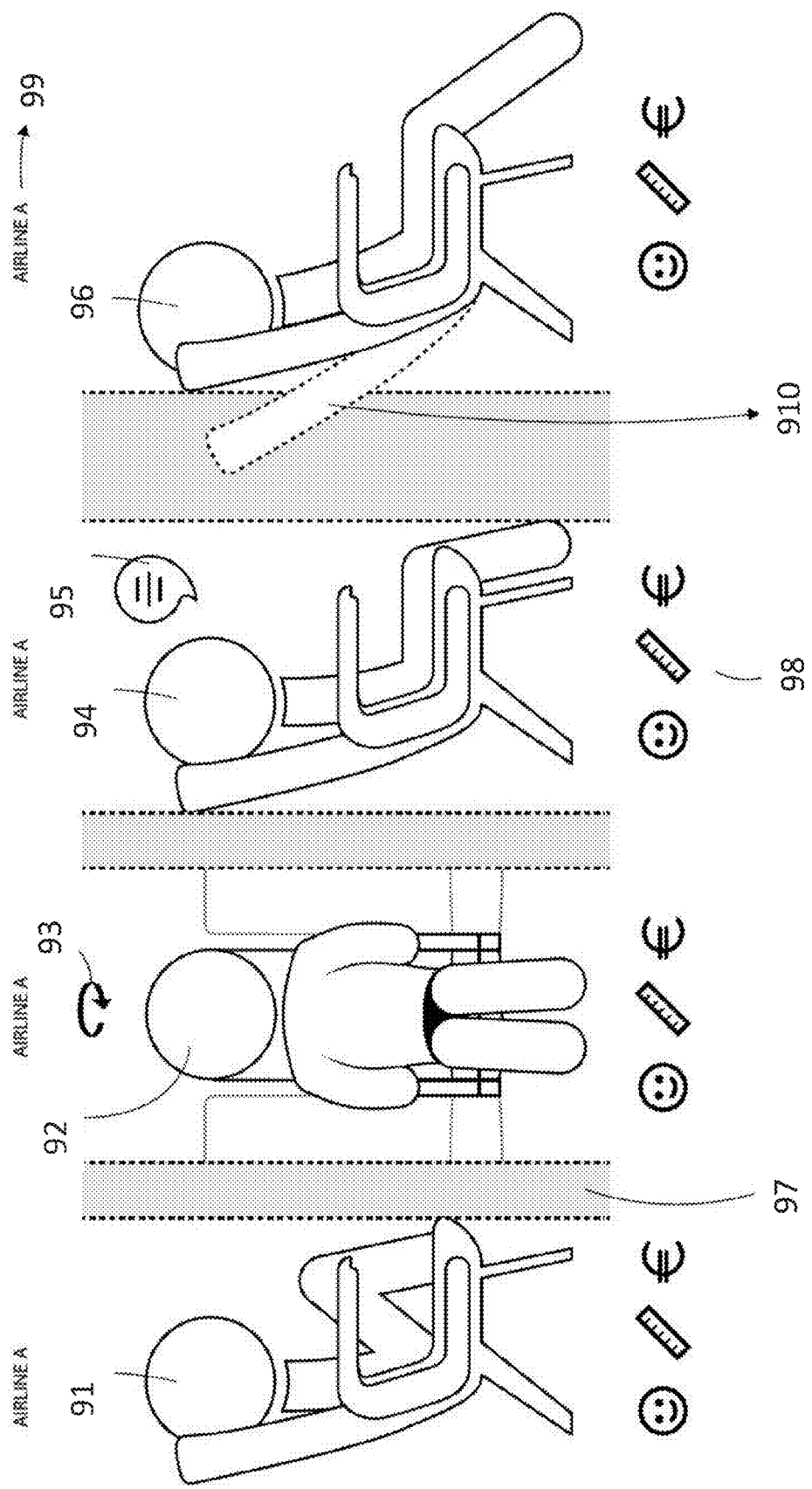
FIG. 9B shows another non-limiting exemplary embodiment of a ranked list of search results generated based on the traveler's physical characteristics, preferences, and/or other search criteria using the system, method, and media as disclosed herein.

In some cases, the graphical information as disclosed herein may include a chart comparing the volumetric physical space of the user to the usable seat space, for example, in FIG. 7. In some cases, the graphical information may include a virtual seat with or without a travel avatar sitting in the seat, as shown in FIGS. 8 and 9A-B. Such graphical information is indicative of seating comfort in the selected seat.

In an exemplary embodiment shown in FIGS. 9A and 9B, a user may compare one or more different seats in the search result by visualizing travel avatar within the virtual seats representing these actual seats. In this embodiment, the avatar 91 sits uncomfortably in a virtual seat of airline A, with no space to relax its legs, as space between neighboring seats 97 indicated is not enough for stretching legs. Such neighboring seats may be in the same row or in the same column. Avatar 94 stretches its legs as the seat pitch increases in a different flight seat, and avatar 96 comfortably seats in another virtual seat as the seat pitch is the largest among three different seats with in the same airline or among different airlines 99. In this embodiment, movement of the avatar may be achieved by using an interactive button/tab 93 and/or direct interaction with a body part of the avatar. In this particular case, key factures 98 for comparison are presented, for example, comfort, usable space, and cost. Optionally, clicking or other interaction with the graphical icons representing these features may render comparison information related to those icon(s) to the traveler. The user optionally reclines the seat back 910 into the space between seats 97 to see how much reclining the seat allows in its usable space.

Figure 11:
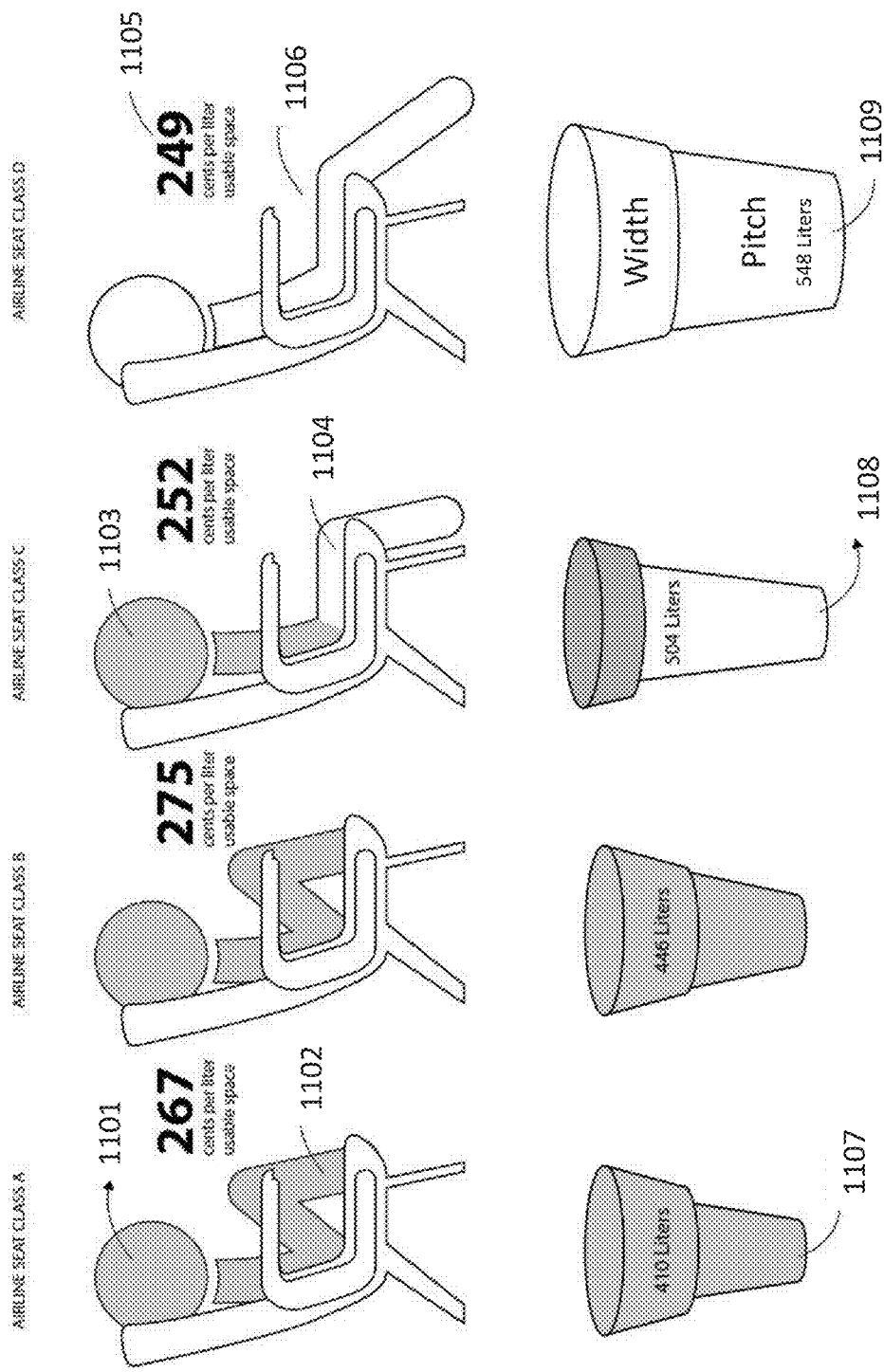
FIG. 11 shows a non-limiting exemplary embodiment of search results generated using the system, method, and media as disclosed herein.

In some cases, the interactive graphical information may include a virtual seat with or without a travel avatar sitting in the seat, as shown in FIGS. 8 and 9A-9B. In some cases, the interactive graphical information disclosed herein may allow the user to move the seat and/or the travel avatar to visualize seating experience or computed comfort in the selected seat. In an exemplary embodiment, as the user changes seat pitch of a seat in the ranked list using the change pitch arrows, the avatar may gradually stretches its legs as the seat pitch increases. In addition, the length of vertical bar of the graph 1107 representing seat space as shown in FIG. 11 may change accordingly as the seat pitch varies.

Rather than providing a single search result, or a list of multiple entries of plain text information, the ranked listed disclosed herein provides comprehensive, convenient, and easy-to-interpret information of at least three different flight seats. Further, the ranked list provides the user with the ability to compare two or more seats with easy-to-understand, comprehensive, and interactive information.

In some embodiments, the systems, methods, and media disclosed herein include a software module that allows the user to visually compare the calculated volumetric physical space of the traveler with seat spaces of a plurality of seats of selection.

For other instances, the systems, methods, and media disclosed herein include a software module allowing the traveler to visually compare two or more seat spaces of seats in the list. In further cases, the seats in comparison include the optimal seat and one or more competing seats. Alternatively, the seats in comparison do not include the optimal seat.

Referring to FIG. 7, in a particular embodiment, three different seats 71, 72, 73 selected by the user were compared via a two-dimensional colored or shaded bar graph. The shoulder width of the three seats were scaled identically and displayed along the horizontal axis, while the shaded area 71-73 represents different usable seat space of the three seats. The volumetric physical space of the user 74 is also superimposed on each of the bars representing the usable space of each seat. The user optionally visualize the shoulder width of the seat in comparison to the traveler's shoulder width, and how much physical space is needed directly superimposed on how much usable seat space to be purchased. In this particular embodiment, the seat with 1200 liters of space renders more space that the user needed, while the other two seats offers less space than what the traveler needs. The dotted area indicates the extra space that the traveler needs. In certain instances, the visualization facilitates direct and convenient comparison between the volumetric physical space and any selected seat space and comparison among seat spaces. Thus, the comparison helps the user to avoid unnecessary cost for extra space that is not needed and to select the optimal comfort within a reasonable price range. In the same embodiment, the bar graph optionally allows comparison of seat spaces among selected seats. Optionally, the user can compare the width of the bars 71, 72, 73 that represents the shoulder width of the seats, and the height of the bars as the total volume of the seats.

Although the ranked list may allow presentation of the information disclosed herein all at once to the user, in order to not provide overcrowded information in the ranked list, the user can have the option to select only information of interests to be displayed in the ranked list. The other unselected information may be hidden and/or accessible to the user via hyperlinks, interactive graphics, icon, links or other tools. In other cases, the systems, methods, and media disclosed herein automatically select information to be displayed to the user with other information hidden and/accessible to the user when the user interacts with the ranked list.

In some embodiments, the ranked list may include one or more user-selectable tabs or icons, so that information grouped under each tab or icon may be displayed when the user selects the corresponding tab. Referring to FIG. 8, in this particular embodiment, the optimal seat 81 is shown along with at least two other competing seats. The optimal seat is optionally highlighted. The user may interact with the features as shown in FIG. 9 to compare two or more seats in the ranked list. Optionally the price for each seat can be shown by interaction with the specific graphical icon 98. The user optionally selects the icon 98 to view the seat pitch information of the one or more seats in the list. The user may also tab or click again to hide the expanded information under one or more tabs.

After input of search information/criteria, the user may get directed to a page with initial results. In some embodiments, an optimal seat is shown in the search result. The search result optionally includes at least two competing seats that the user can review by interacting with the search result page shown in FIG. 8, for example, sliding a scroll bar, clicking an arrow key, or the like. In some cases, the user optionally extends seat pitch of the optimal seat to at least 34 inches using icons to the right of the search result, a competing seat with a seat pitch of 36 inches shows up. The user optionally further extends seat pitch to 38 inches, another competing seat with the matching seat pitch appears and with cost per unit seat space, total cost, and other related information. The user optionally extends the seat width using icons to the right of the second competing seat. After the user is satisfied with the seat space, he/she can click on an interactive icon to view one or more seats that meets his/her criteria and/or preferences in a seat map, for example, shown in FIG. 12.

In some cases, the search result includes a two-dimensional graph indicative of seat width and seat pitch information. In an exemplary embodiment, the seat is labeled with its ranking in the list as the search results. One or more seats may be ranked for the same number in the list. Referring to FIG. 11, in a particular embodiment, the shoulder width (at the shoulder level of the seat back) and/or the hip width (at the base level of the seat back) are indicated by the width of a horizontal bar 1107, 1108, 1109 labeled as "width," while the seat pitch is indicated by the length of a vertical bar underneath the horizontal bar labeled as "pitch." In some case, such two-dimensional graph representing the seat space may be proportionally scaled accordingly and the bar width/length reflects the size of the actual seat such that the size information is conveniently presented to the user thus providing direct and easy comparison of different seats. In further embodiments, color, shading, pattern, or the like are superimposed in corresponding portion(s) of the two-dimensional graph of virtual seat and avatar in order to make the comparison more direct, efficient, and convenient for the user.

In some cases, the systems, methods, and media disclosed herein may provide access to the user for visualization, interaction with one or more seats, comparison, and selection of one or more seats in the search results. In further cases, the systems, methods, and media disclosed herein may provide additional accesses for a user after selecting a number of seats from the search results. For examples, the additional access may lead to a detailed seat map, a website for booking flight(s), or the like.

Travel Avatars

For certain instances, the systems, methods, and media disclosed herein compute a virtual body, i.e., a travel avatar, for representing the traveler in a virtual space based on the physical information that the traveler provides. In some cases, the virtual space is derived form an actual space of a flight, an aircraft cabin, seats, or the like. In some cases, a virtual body, a travel avatar, an avatar, a Travatar, and a Travvi are equivalent terms herein. In some cases, a virtual body, a travel avatar, an avatar, a Travatar, and a Travvi are synonyms herein. In some cases, a virtual body, a travel avatar, an avatar, a Travatar, and a Travvi are equivalent terms indicating the virtual representation of a traveler's physical body in two or three dimensions. The travel avatar is used to facilitate searching and comparing the best seat, bed, or any other product that meets the traveler's personalized needs. In some embodiments, the avatar has a two-dimensional or three dimensional shape and size. In some embodiments, the avatar is visually displayed to the user using a traditional display, a virtual reality tool, an augmented reality tool, or the like. The travel avatar may be two dimensional or three-dimensional. In some embodiments, the avatar includes a size that is scaled from the physical information entered by the user. In further cases, two or more different body parts are scaled with an identical scaling from the user. For examples, the avatar may have a height that is 0.1 of the user's actual height and a hip width that is 0.1 of the user's actual hip width. In further cases, the scaling of the avatar from the actual user matches the scaling of the virtual seat from the actual seat. In other word, the size of the avatar relative to the virtual seat remains the same as the size of the user relative to the actual seat. Such scaling may be advantageous to mimic the real seating experience thus reflecting the comfort more accurately. In some cases, scaling information may be displayed to the user or adjustable by the user.

In some cases, the travel avatar includes one or more body parts. The size and dimension of the one or more body parts utilize the user-entered physical information, however if such information is unavailable, estimation based on a database of similar user will be used. For examples, if the user only entered body weight and height without any other additional physical information. An avatar with the exact body height will be generated with estimated body size, shoulder width, leg length, or the like. Such estimation may be based on the age, gender, race, and/or other available information of the user. In some embodiments, the avatar may include one or more body part with calculated rather than estimated information. These body parts may include but not limited to a body height, a shoulder width, a hip width, a leg length, a femur length, a weight, a Body Mass Index (BMI), a waist size, a body shape, or the like.

In some instances, the travel avatar is used for visualization of seating experience in a seat, bed, or other product. As a user seats in a flight seat, the body can move either passively due to the movement of the seat or actively while the seat remains still. The travel avatar as disclosed herein, in some cases, mimics the movement of the passenger in a sense that it may also move passively or actively in the seat to optimize visualization of the seating experience in the seat under a wide range of circumstances. Movement of the travel avatar is optionally depicted by 2D or 3D animation, a series of images, or alternative images showing various motions. As an example, when the recline angle of the seat is altered, either by the input of the user, or automatically by the system, method, or media disclosed herein, the user's body moves with the seat back. With the passive movement of the body, the user may visually identify how different parts of the body are influenced by the recline angle. For examples, is there enough support for the neck and head while the seat is reclined, does the lower legs have enough room to allow its passive stretching caused by the upper body pitching, or the like. As a different example, while the seat remains still, the user may move one or more part of the travel avatar to test comfort of the usable seat space. A user may try lay down sideways or in a preferred posture in the seat and see how the lower back is supported. A user may also try to bend down and see if the seat size allows such movement or not.

In certain cases, the travel avatar is used for visualization of computed comfort of the traveler in a seat, bed, or other product. In further cases, the computed comfort is directly displayed on the travel avatar for visual perception. The computed comfort may quantitatively or qualitatively indicate mechanical information of one or more selected regions of the traveler within the seat. For examples, the computed comfort may be a color-coded superimposed on the avatar while the colors indicating different level of pressure that may be caused by seating in the selected seat to the body. The color-coding of the computed comfort can depend on different color maps, the color maps may be pre-determined. As an example, a flight seat without back support may results in localized increased lower back pressure as compared to other seats with lumbar support. As another example, a flight seat with a shorter seat-back height may render a computed comfort display with coloring indicating increased neck pressure. Advantages of quantitatively displaying the computed comfort using color coding can include direct and easy interpretation of comfort in the selected seat. Further, the quantitative display may provide comprehensive comfort in any specific region of the body while sitting in the selected seat virtually.

In some cases, the color coding may have different resolutions. In some cases, the color coding may be for different regions of the body such as shoulder area, chest area, neck, head, lower back, hip, and the like. In other cases, the color coding may be different patches smaller than a region of the body. In some cases, the color coding resolution may be higher such that the color is for each individual image unit, like voxel, of the travel avatar.

Referring to FIG. 10, a two dimensional or three dimensional travel avatar is generated and used herein for virtual seating experience in one or more selected seats. An avatar shell 1011 may be generated for each traveler, and then the user may access a travel avatar personalization application programming interface (API) 1012 to add specific characteristics of the traveler to the avatar shell. Traveler's physical information 1013, personal preferences 1014, and/or personality 1015 can be added, modified, or removed to the sell. Other information of the traveler 1016 the Different views of the avatar may be presented depending on the user's interaction with the avatar. Based on this information, mathematical, statistical, and/or empirical algorithm(s) 1018 can be used to generate a personalized travel avatar 1019 that is customized to represent the traveler. Such information can be saved in the database 1017 of the system, method, and media disclosed herein.

As an example in FIGS. 9A and 9B, a side view of avatar seating in different seat may reflect the seat pitch changes on the leg room thus the extent that legs of the avatar can move. Optionally, the avatar may be color-coded in different body parts, e.g., shoulder, hip, leg, femur, etc, as shown in FIG. 6.

Referring to FIG. 11, in a particular embodiment, color coding is optionally used to indicate comfort of travel avatar in selected seats. In this case, the travel avatar is shaded in corresponding zones, i.e., head space, shoulder space, and leg space, to indicate crowded seating experience without enough usable space 1101-1103 in one or more selected seats, while a different shading indicate comfort and enough seat space for the avatar 1104, 1106 in one or more selected seats. Further, in this embodiment, various portions bar graph 1107-1109 representing seat width (shoulder width and/or hip width) and pitch are also color coded to indicate enough or not enough space for one or more seats.

Virtual Seats

In some embodiments, the systems, methods, and media disclosed herein include one or more virtual seats. The virtual seat, for certain instances, represent an actual seat so that a user may obtain information of usable seat space, comfort, privacy, or any other aspects related to the seating experience.

In some cases, the virtual seat has a size that is similar to the actual seat it is representing. In other cases, a virtual seat may be scaled in its size and shape such that the entire seat and its physical dimension are uniformly scaled from the actual seat. In some cases, the scaling information is available to the user. In further cases, the scaling information may be provided with text information or a plotting scale bar. In some cases, the recline angle and/or other rotational characteristics of the seat may not be scaled.

In some embodiments, the systems, methods, and media disclosed herein allow a user to visualize virtual seat(s) that represent actual seat(s) for comparison and selection of a flight seat or a product of the like. The virtual seat(s) may be three-dimensional. The virtual seat(s) may be visualized from different viewpoints in the three-dimensional space surrounding it thus providing comprehensive and easy to interpret graphical information of the corresponding actual seat(s). Additionally, the actual seat(s) are visualized in relation to its corresponding surroundings via visualization of the virtual seats so that information related to the neighborhood of the actual seat(s) can also be provided to the user for seat selection purpose. As an example, a user may start from a three-dimensional view of the cabin that the actual seat(s) locates in, and manually or automatically zoom in to the specific seat. The user may select different point of views to see the virtual seat in three dimensions to check out the leg space. The user may also rotate and see if the cabin wall curves and cuts usable seat space near the arm-rest.

The systems, methods, and media disclosed herein allow a user to visualize movement of the virtual seat(s) in three dimensions that mimics the real movement provided with the actual seat. More importantly, such movement of the virtual seats may be compared to movements of seats that the user select or is familiar with in order to optimally estimate comfort in the virtual seat. Such visualization facilitate interpretation thus comparison of flight seats or other products especially with characteristics that the user is not familiar with, such as the pitch. As an examples, the user may select a seat that he or she has flew several times in with a pitch of 36 inches and compare its virtual seat to a new virtual seat that provides a pitch of 39 inches. The user may recline the seat back by interaction with the virtual seat and compare the virtual seat and its space in different positions between two seats.

Additionally, the visualization of movement of the virtual seat is not in the void but in a virtual surrounding reflecting the actual environment of the actual seat. Thus, movement of the virtual seat is accurate in reflecting influences of the environment on the movement of the actual seat. For example, a user can see how the usable space is changed when the seat in front of is reclined. As another example, a user can see if the seat back thickness may affect the extra pitch that one seat provides over another seat.

In some cases, the virtual seat includes a two-dimensional graph indicative of seat width and seat pitch information. In an exemplary embodiment, the virtual seat is labeled with its ranking in the list as the search results. The shoulder width (at the shoulder level of the seat back) and/or the hip width (at the base level of the seat back) are indicated by the horizontal bar labeled as "width," while the seat pitch is indicated by the vertical bar underneath the horizontal bar labeled as "pitch." When the seat pitch gets to a predetermined level, the legs of the avatar representing the traveler may start to bend. In some case, such two-dimensional graph representing the seat may be proportionally scaled and the bar width/length reflects the size of the actual seat. Similar graphs may be added for display in the ranked list, for examples in FIGS. 8, 9A, and 9B, such that the size information is conveniently presented to the user thus provide direct and easy comparison of different seats. In further embodiments, color, shading, pattern, or the like are superimposed in corresponding portion(s) of the two-dimensional graph of virtual seat and avatar in order to make the comparison more direct, efficient, and convenient for the user. As an examples, a hip region of the avatar and the bottom portion of the horizontal bar labeled as "width" may be shaded similarly, so that the user can easily compare the seat width at the base of the seatback to the hip width.

Additionally, the virtual seat as disclosed herein may be visualized with text information in additional to the graphical information. Such text information is not limited to traditional text information of seat number, row number, cabin type, or flight information. The text information as disclosed herein, in some cases, provides complementary information to the graphical information provided by the virtual seat(s) regarding the estimated comfort, advantages, and/or disadvantages of the actual seat. Similarly, the text information, in some cases, provides information directly related comparison of usable space of two or more user-selected seats. As an example, the text information may indicate two seats have the same usable space but one seat with much narrower arm-rest. As another example, the text information may indicate that the actual seat is at the last row of the cabin therefore the real usable pitch is smaller than seats in other rows.

In some cases, the text information is automatically generated by the system, methods, and media disclosed herein. In other cases, the text information is related to the preferences entered by the user for the selection of a seat. In yet other cases, the text information is extracted from feedback, review, comments, or the like of travelers that share similar physical information as the user. As one example, the text information may indicate that traveler with neck pain found the actual seat uncomfortable due to lack of neck support. As another example, the text information may indicate the actual seat is next to a curved cabin sidewall, which makes the usable space smaller than window seats next to a more flat cabin sidewall. As yet another example, the text information may indicate the actual seat is an aisle seat, which makes the usable space greater than window seats.

In some cases, user interaction with the graphical information or text information may be possible for adjusting one or more aspects of the virtual seats so the visualization of actual seat(s) provides customized and/or user-selected information.

Alternatively, the systems, methods, and media disclosed herein allow a user to visualize a virtual seat in at least a portion of the seat map in two dimensions or three-dimensions optionally with text information. Visualization of the seat in a seat map advantageously provides complementary and more comprehensive information to the user in addition to the information of the virtual seat itself. In addition, virtual seats of same seat characteristics may be compared in the virtual seat map for selection of an optimal seat. Further, if more than one seat is needed for a group travel, viewing the actual seat in the virtual seat map facilitate selecting available seats for the entire group.

Figure 12:
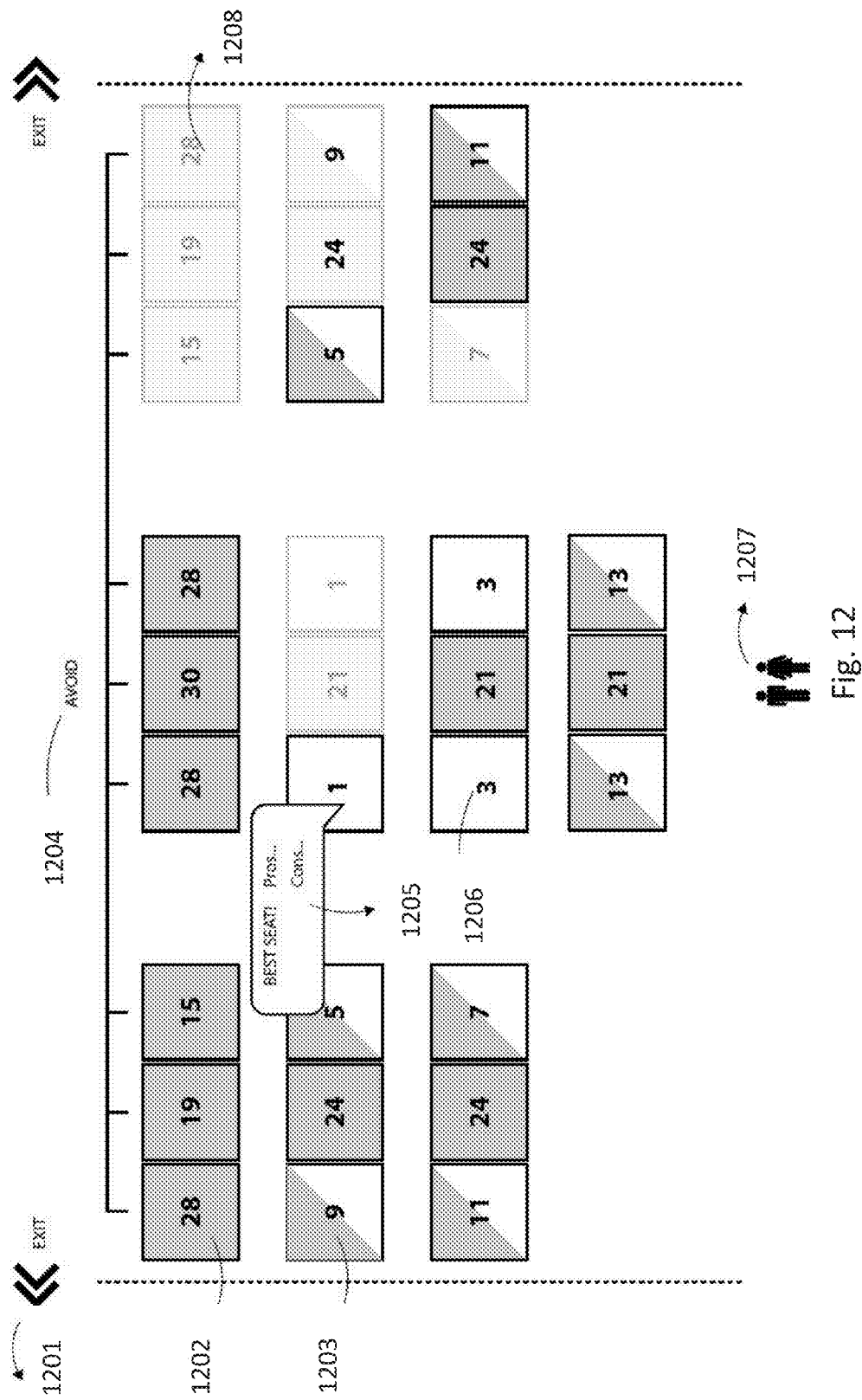
FIG. 12 shows a non-limiting exemplary embodiment of a seat map with complementary text and/or graphic information in the system, method, and media as disclosed herein that facilitates a user's selection and comparison of flight seats.

Referring to FIG. 12, in a particular embodiment, two dimensional seat map(s) is shown optionally with complementary text and/or graphical information. In this case, the seat map includes a top view floorplan 1201 including exit rows 1204, lavatories 1207 with available seats and occupied seats 1208. In this case, the user is searching and selecting seat(s) for a night flight. One or more seats are labeled with its seat ranking consistent to that in the search result. Two or more seat may share the same rank. In this case, the complementary text and/or graphical information optionally indicate exit row seats 1202 that certain traveler should avoid. Optionally, the seat map includes color coding with or without text information to indicate additional seats 1203 that certain traveler should avoid if possible. In this case, text information is provided to indicate ranking of individual seat. Optionally, seat 1205 is a good match, ranking No. 3 in the ranked list, to user/system-generated criteria. The seat also optionally allows user-interaction that leads to display of more detailed information 1206. The optimal or most recommended seat(s) 1206, e.g., seats ranking the first place, is optionally provided with complementary information about the advantages and possible disadvantages of the seat. In this embodiment, the text information may include that the optimal seat is relatively far from both the exit row and the lavatories so that is may have less noise and disturbance. Additionally, text information optionally indicates that it is an aisle seat so that it has more usable space and it is more convenient than middle or window seats. In some cases, seats with higher rankings (smaller ranking numbers) are more recommended than seats with lower rankings (larger ranking numbers).

In some cases, the text and/or graphical information indicates that certain window seats may experience fewer disturbances from neighbors getting up and traffic going to front or back lavatory and the window seats offer less space than aisle seats. In some embodiments, the aisle that leads to four lavatories is marked as a "busy aisle," so that the user can consider seats at other aisles, directly leading to fewer lavatories instead if the traveler wants extra space and fewer disturbances. Optionally, the seat map offers the convenience so that the user can compare seats that are ranked similarly in the search results with their actual location in the seat map, and make selection based on additional text and/or graphical information provided with the seat map.

Instead of seat-maps, the user may also select to view images and/or virtual tours of the actual cabin for selection and comparison of seats. In some particular embodiment, a two dimensional image of an actual cabin is shown optionally with complementary text and/or graphical information. The user-selected seat(s) may be visually distinguishable from other seat in the image. For example, using arrows, superimposed color, text, or any other available mean. The user may interact with the image to view desired aspects of any seat(s) in the image. As non-limiting examples, the user may zoom in, zoom out, scroll or click on the edge of the image to alter the field of view, or the like. In some cases, text providing complementary information to what shown in the search results is also shown with the image.

Color Coding

In some embodiments, the systems, methods, and media disclosed herein enable color coding of text, virtual graphical information, avatar, virtual seat, actual image, or the like. In some cases, color coding with a same or similar color indicate parts that can mechanically or physically contact each other. For instances, a shoulder portion of a virtual seat may be color coded similarly as the shoulder portion of a virtual seat or a shoulder portion of an image/photo of an actual seat. In alternative cases, color coding may be indicative of force, pressure, stress, strain, or other mechanical information of the coded area. In some cases, a heat map or a color map is used to represent information at different given levels. The reference of a heat map, i.e., a look-up map, a look-up table or the like may be any customized or readily available references linking each specific color/shading/pattern to at least one predetermined value. In some cases, the heat map may be used regionally, for example in troubled or stressed areas. In alternative cases, the heat map may be used globally, for example, in all different regions of an avatar. For example, a virtual body may be color coded such that warmer colors indicate more stress in the avatar caused by the seating experience while cooler color indicate less stress and more comfort in the avatar caused by the seating space. In other cases, color coding may be used to highlight area(s) that might need extra attention from the user. For example, the vertical bar in the graphical representation of a seat space may be colored red to indicate seat pitch that is smaller than what a traveler might need.

Referring to FIG. 6, in a particular embodiment, different physical zones of a personalized travel avatar is color coded. Optionally, the face/head zone 61, shoulders and torso 62, legs 63 are color coded differently. Such color coding can be consistent in different views of the travel avatar. Such color coding may assist comparison of flight seats, in particular, optionally, a user may visualize how far the face zone of an avatar is to the upper region of the seat back of the seat in the front row. Similarly, a color coded shoulder zone may facilitate the user to compare the width of the seatback at the shoulder level especially when the seat back is also colored with a same or a similar color. In this embodiment, the color coded leg zone optionally helps the user to identify effect of seat pitch in affecting leg room of the passenger.

In some cases, the color is super-imposed on the text, graphical, or other information. The color-coding may be reversibly added to or removed from presentation to the user. Such addition or removal may be controlled by the user and easily switchable by user interaction with an input device.

For certain instances, color coding may be replaced by different shading, pattern, texture, or the like to serve similar purposes as color coding.

In some embodiments, a heat map or use of the same may be used for color coding. A heat map may be used to Reviews by Travelers In some embodiments, as disclosed herein, the systems, methods, and media allow a traveler to view reviews from other travelers about the aircraft, the seat, or both that they are considering. In some embodiments, the reviews can be all the reviews recorded or available to the traveler. In other cases, the reviews are preferably from other travelers that have common characteristics as the traveler. For examples, the other travelers can be of a similar physical size to the traveler, have similar preference(s) as the traveler, and/or have similar personality as the traveler. Other characteristics may include a health condition, an age, a gender, a height, a shoulder width, a hip width, or the like. In some cases, the preference may be any facility or inflight entertainment. Non limiting examples include a WI-FI, a seat-back screen, a reading light, a power outlet, or the like. In other cases, the preference may be a seat location or a seat type such as a window seat, a middle seat, an aisle seat, an exit row, a seat close to a restroom, or the like.

Referring to FIGS. 9A and 9B, in a particular embodiment, seat, flight, or airline review 95 may be provided by the user via interaction with the graphic icon.

Multiple Travelers

In some embodiments, the systems, methods, and media disclosed herein allows search of multiple flight seats either simultaneously or consecutively for a group with multiple travelers. In some cases, search options including traditional search criteria, physical information, personal preferences, and/or personality that are shared among all travelers in the group are entered separately as the non-commonly shared search options. Such commonly shared options are given equal or more weight than those non-commonly shared search options. The search result may be generated listing the search results that only satisfy the commonly shared search options. In other cases, the search result may be generated listing the search results that satisfy not only the commonly shared search options but also part of the non-commonly shared search options. In some cases, each search option are weighted and considered in a search. Alternatively, in the search process, each non-commonly shared search option of the group of multiple travelers may be processed to generate a group average search option to be used in a search. Such group average may be determined by weighted average of all selections of the group members. For example, if two in the group strongly prefer non-stop flight, while the others have no specific preference about stops, then non-stop flights will be used as a search option for the group. As another example, if one of the group member need a front row seat for infant care, that option can be given a high weight in the search, as a result, the recommended search result may include at least one such seat if there is any such front row seat available. Other mathematical, statistical, or empirical methods may be used to calculate and derive a group search option for all the group members, which may be average, a weighted average, a median, or a value with mathematical or statistical manipulations. Alternatively, all search options of all group members are entered separately and a search may only consider a group of seats that satisfy all the search options. If no such seats can be found, the search will generate results that best satisfy the search options.

In other cases, the user may be asked to select one or more travelers and search for the one or more flight seats first, while the other seats can be selected using a subsequent and narrowed search. In some embodiments, a screening search of available seats that is greater than or equal to the number of total travelers in the group is first performed. And subsequent searches may be performed using other search options of one or more members in the group of travelers.

Similarly as the single traveler case, a user may view a ranked list of search results. Each search result may comprise multiple seats in a group. For instances, a user can visualize seating experience in one or more individual seat of the group. The optimal seat may indicate an optimal group of seat while the other two competing seats may represent competing group of seats.

Input Devices

In some embodiments, the systems, methods, and media disclosed herein allows user interactions with a travel avatar, a virtual seat, a seat map, a seat in a seat map, or any other virtual representation of actual features related to a seat or an aircraft via an input device. In further embodiments, the input device comprises a touchscreen, a mouse, a keyboard, a pointing device, a remote control, a camera, a joystick, a trackball, a track pad, a game controller, a stylus, a microphone, a motion sensor, a remote control, an eye movement sensor, a temperature sensor, an optical sensor, a pressure sensor, or the like. In further embodiments, the interaction comprises a touch, a click, a tap, a drag, highlighting, circling, contouring, a gesture, pointing, swiping, pressing, an eye movement, crossing, or the like.

After Seat Selection

Having decided on the seat and flight, a traveler can then be transferred to the relevant airline or travel agent to complete the purchase. Alternatively, the systems, methods, and media disclosed herein may include a software module to allow the user to complete the purchase directly without transferring to external tools, software, and/or websites.

In some cases, after deciding on the seat and flight, a user is directed to a seat map where they can choose the actual seat numbers and book the flight. In further embodiments, the seat map may be a regular seat map with additional information to indicate the user's previous selection. For example, seat(s) that matches the user's selection may be highlighted or superimposed with text or color information. Additionally, in some cases, if there is more than one seat that matches the user's selection, additional information indicating difference(s) in seats is provided in the seat map. For examples, if three available seats match the user's cost per space requirement, they can be highlighted and selectable in the seat map. Further, each seat can be labeled with text information indicative of additional information specific to each seat. One can be labeled as "possible noise and traffic from nearby toilets," another can be labeled as "window seat, less disturbance from neighbors in an overnight flight," and the other can be labeled as "aisle seat in the middle of the cabin with possibly the least passing traffic."

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 13:
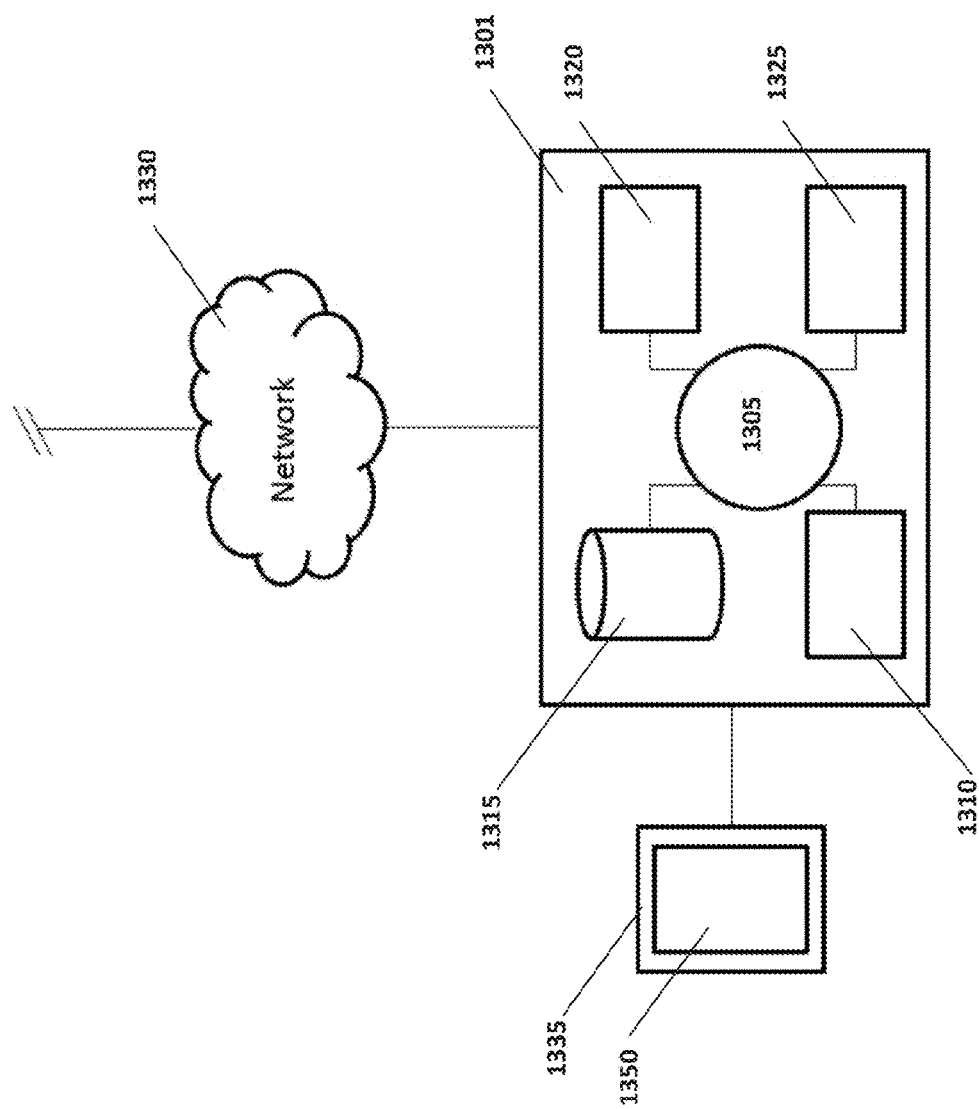
FIG. 13 shows a non-limiting exemplary embodiment of a digital processing device as disclosed herein.

Referring to FIG. 13, in a particular embodiment, an exemplary digital processing device 1301 is programmed or otherwise configured to measure test-retest reliability using FRP, MAP or other suitable precision evaluation methods. The device 1301 can regulate various aspects of test-retest precision measurement of the present disclosure, such as, for example, formulating test-retest reliability as an information retrieval problem, and ranking retest measurements by their distance to a subject's test measurement. As another example, it may assess a similarity between a test result and a retest result. In this embodiment, the digital processing device 1301 includes a central processing unit (CPU, also "processor" and "computer processor" herein) 1305, which can be a single core or multi core processor, or a plurality of processors for parallel processing. The digital processing device 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The digital processing device 1301 can be operatively coupled to a computer network ("network") 130 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the device 1301, can implement a peer-to-peer network, which may enable devices coupled to the device 1301 to behave as a client or a server. The digital processing device 1301 can be operatively connected to one or more specialized medical device (not shown) via the network 1330. Such connection may enable data collection from the medical device; the data may include one or more test results, retest results, and other related test and subject information. The specialized medical device is configured to measure visionary features(s) of one or more subjects.

Continuing to refer to FIG. 13, the CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and write back. The CPU 1305 can be part of a circuit, such as an integrated circuit. One or more other components of the device 1301 can be included in the circuit. In some cases, the circuit is an application specific integrated circuit (ASIC) or a field programmable gate array (FPGA).

Continuing to refer to FIG. 13, the storage unit 1315 can store files, such as drivers, libraries and saved programs. The storage unit 1315 can store user data, e.g., user preferences and user programs. The digital processing device 1301 in some cases can include one or more additional data storage units that are external, such as located on a remote server that is in communication through an intranet or the Internet.

Continuing to refer to FIG. 13, the digital processing device 1301 can communicate with one or more remote computer systems through the network 1330. For instance, the device 1301 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. The entries of the database(s) disclosed herein are searchable using the search module/engine as disclosed herein.

In some cases, disclosed herein is a database of a plurality of seats, each of seats including one or more parameters of a seat space. In further cases, one or more parameters of a seat space are a direct parameter or a derived/calculated parameter based on one or more parameters of the seat space. In other cases, each of the seats includes one or more parameters that are not related to direct or derived parameters of the seat space.

In some cases, disclosed herein is a database of seats containing information extracted from external sources to the systems, methods, and media disclosed herein. The external sources may include commercial airline databases, webpages, websites, online cloud database, or any other commercially available data sources. In some cases, the database disclosed herein includes at least one parameter of a seat space. In further cases, the database disclosed herein includes at least one parameter of a seat space that is not directly obtained from external commercial sources. In yet further cases, the database includes at least one parameter of a seat space that is derived or calculated based on data from external commercial sources. In alternative cases, the database includes at least one parameter of a seat space that is directly measured and entered using the systems, media and methods disclosed herein. For example, the data based may include a leg space that is derived or calculated from commercially available information of the seat space. As another example, the database includes a price per unit usable space of the seat that is calculated based on the flight ticket price and the usable space available from external sources.

The database disclosed herein, in instances, includes a plurality of users; each of the users includes one or more parameters of physical information of the user. In further cases, one or more parameters of the physical information are direct physical information or a derived/calculated parameter based on the physical information of the user. In other cases, each of the users includes one or more parameters that are not related to direct or derived parameter of the physical information of the user.

In view of the disclosure provided herein, those of skill in the art will recognize that many databases are suitable for storage and retrieval of barcode, route, parcel, user, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

All publications, patents, and patent applications mentioned in this specification are herein incorporated by reference to the same extent as if each individual publication, patent, or patent application was specifically and individually indicated to be incorporated by reference.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented system for flight seat searching, comparison, and selection based on physical characteristics of travelers and usable flight seat space, the system comprising:
   a. a digital processing device comprising an operating system configured to perform executable instructions and a memory;
   b. a database of a plurality of seats, each of the plurality of seats comprising a seat space; and
   c. a computer program including instructions executable by the digital processing device to create a flight seat searching, comparison, and selection application comprising:
      i. a software module allowing a traveler to enter physical information of the traveler and one or more search criteria;
      ii. a software module calculating a volumetric physical space that the traveler needs based on the physical information;
      iii. a software module generating a list of seats from the plurality of seats based on the physical information and said search criteria, the list comprising:
         1) an optimal seat, the optimal seat comprising a first seat space, the optimal seat having a first cost per unit seat space in the list; and
         2) two or more competing seats, wherein one of the two or more competing seats has a second seat space that is greater than the first seat space, while the other has a third seat space that is smaller than the first seat space;
      iv. a software module allowing the traveler to visually compare the calculated volumetric physical space of the traveler with seat spaces of a plurality of seats in the list;
      v. a software module allowing the traveler to select a seat from the list;
      vi. a software module generating a travel avatar based on the physical information of the traveler, the travel avatar being three-dimensional; and
      vii. a software module allowing the traveler to visualize three-dimensional movement of the travel avatar in the selected seat, the traveler represented by the travel avatar and the selected seat represented by a virtual seat.

2. The system of claim 1, wherein the plurality of seats are flight seats.

3. The system of claim 1, wherein the seat space comprises one or more selected from: a total seat space, a seat width, a seat pitch, a seat-back height, a total usable seat space, a usable seat width at a base level, a usable seat width at a shoulder level, a usable seat pitch, an arm-rest width, a distance between bases of seatback cushion in two adjacent rows, and a distance between head-rests in two adjacent rows.

4. The system of claim 1, wherein the physical information of the traveler comprises a height, a shoulder width, a hip width, a leg length, a femur length, a body weight, a body shape, a body mass index, or a combination thereof.

5. The system of claim 1, wherein the one or more search criteria include a type of aircraft, an age of aircraft, duration of flight, duration of stay, number of connections, departure time, return time, a price range, priority boarding, a window seat, an aisle seat, an exit-row seat, a back-row seat, a front-row seat, a cabin type, in-seat power outlet, food, beverage, an in-seat digital display, in-seat entertainment, WI-FI, a distance to a lavatory, a review rating, or a combination thereof.

6. The system of claim 5, wherein the review rating is from a second traveler that has similar physical information as the traveler.

7. The system of claim 1, wherein the one or more search criteria are weighted based on one or more of the preferences of the traveler.

8. The system of claim 1, wherein the volumetric physical space that the traveler needs comprises a shoulder width, a hip width, a leg length, or a combination thereof.

9. The system of claim 1, wherein the volumetric physical space of the traveler is distinguished to the seat spaces at least by color.

10. The system of claim 1, wherein the visual comparison comprises graphical information and text information.

11. The system of claim 1, wherein the travel avatar has a first scaling from the physical information of the traveler and the virtual seat has a second scaling from the seat space of the selected seat, the first scaling and the second scaling being three dimensional and equal to each other.

12. The system of claim 1, wherein the travel avatar and the virtual seat are color-coded such that a first area of the travel avatar is in a same color as a second area of the virtual seat that the first area moves with or in contact with.

13. The system of claim 1, wherein the three-dimensional movement of the travel avatar in the selected seat is passive and caused by movement of the virtual seat in three-dimensions.

14. The system of claim 1, wherein the three-dimensional movement of the travel avatar in the selected seat is active and not caused by movement of the virtual seat in three-dimensions.

15. The system of claim 1 further comprising a software module allowing a traveler to move
 a. the virtual seat thereby causing the travel avatar to move passively along with the virtual seat in three-dimensions, or
 b. the travel avatar actively in three-dimensions when the virtual seat remains static.

16. The system of claim 15, wherein the movement of the virtual seat comprises change a pitch of the virtual seat, moving the arm-rest, moving a window shield, moving a foldable table, or a combination thereof.

17. The system of claim 15, wherein the movement of the virtual seat or the travel avatar is via interaction on the virtual seat with an input device.

18. The system of claim 17, wherein the interaction comprises a touch, a click, a drag, a tap, pointing, pressing, swiping, contouring, a gesture, circling, crossing, highlighting, or a combination thereof.

19. The system of claim 17, wherein the input device comprises a mouse, a keyboard, a pointer, a touch screen, a camera, a microphone, a motion sensor, a sound sensor, a pressure sensor, a temperature sensor, or a combination thereof.

20. The system of claim 1 further comprising a software module allowing a traveler to compare the selected seat in a seat map to one or more other seats in the seat map, the seat map comprising text information of the one or more other seat, wherein the text information is not a flight number, a price, a cabin type, a seat number, or a row number of the one or more seats.

21. The system of claim 1 further comprising a software module generating a second list of seats based on the physical information of the traveler, the second list of seats being in a connection flight, a return flight, a transportation means, an accommodation, or an entertainment facility.

22. The system of claim 1 further comprising a software module calculating personality of travel avatar based on data from sources external to said computer-implemented system.

23. The system of claim 1, wherein the one or more search criteria include one or more aspects of personal references of the traveler, one or more aspects of the personality of traveler, or both.

24. The system of claim 1 further comprising a software module allowing the traveler to visually compare the first seat space of the optimal seat with seat spaces of the competing seats in the list.

25. The system of claim 1, wherein one of the two or more competing seats has a second cost per unit seat space that is higher than the first cost per unit space and the other has a third cost per unit seat space that is lower than the first cost per unit space.

26. Non-transitory computer-readable storage media encoded with a computer program including instructions executable by a processor to create a flight seat searching, comparison, and selection application based on physical characteristics of travelers and usable flight seat space, the media comprising:
 a. a database, in a computer memory, of a plurality of seats, each of the plurality of seats comprising a seat space;
 b. a software module allowing a traveler to enter physical information of the traveler and one or more search criteria;
 c. a software module calculating a volumetric physical space that the traveler needs based on the physical information;
 d. a software module generating a list of seats from the plurality of seats based on the physical information and said search criteria, the list comprising:
  i. an optimal seat, the optimal seat comprising a first seat space, the optimal seat having a first cost per unit seat space in the list; and
  ii. two or more competing seats, wherein one of the two or more competing seats has a second seat space that is greater than the first seat space, while the other has a third seat space that is smaller than the first seat space;
e. a software module allowing the traveler to visually compare the calculated volumetric physical space of the traveler with seat spaces of a plurality of seats in the list;
f. a software module allowing the traveler to select a seat from the list;
g. a software module generating a travel avatar based on the physical information of the traveler, the travel avatar being three-dimensional; and
h. a software module allowing the traveler to visualize three-dimensional movement of the travel avatar in the selected seat, the traveler represented by the travel avatar and the selected seat represented by a virtual seat.

27. A computer-implemented method for flight seat searching, comparison, and selection based on physical characteristics of travelers and usable flight seat space, the method comprising:
a. allowing, by a computer, a traveler to enter physical information of the traveler and one or more search criteria;
b. calculating, by the computer, a volumetric physical space that the traveler needs based on the physical information;
c. generating, by a computer, a list of seats from a plurality of seats based on the physical information and said search criteria, each of the plurality of seats each of the plurality of seats comprising a seat space, and the list comprising:
  i. an optimal seat, the optimal seat comprising a first seat space, the optimal seat having a first cost per unit seat space in the list; and
  ii. two or more competing seats, wherein one of the two or more competing seats has a second seat space that is greater than the first seat space, while the other has a third seat space that is smaller than the first seat space;
d. allowing, by the computer, the traveler to visually compare the calculated volumetric physical space of the traveler with seat spaces of a plurality of seats in the list;
e. allowing, by the computer, the traveler to select a seat from the list;
f. generating, by the computer, a travel avatar based on the physical information of the traveler, the travel avatar being three-dimensional; and
g. allowing, by the computer, the traveler to visualize three-dimensional movement of the travel avatar in the selected seat, the traveler represented by the travel avatar and the selected seat represented by a virtual seat.

* * * * *

UNITED STATES PATENT AND TRADEMARK OFFICE
CERTIFICATE OF CORRECTION

PATENT NO. : 9,633,402 B1
APPLICATION NO. : 15/268469
DATED : April 25, 2017
INVENTOR(S) : Richard Charles McCartney Page 1 of 1

It is certified that error appears in the above-identified patent and that said Letters Patent is hereby corrected as shown below:

Claim 27, Column 46, Lines 3-4, "each of the plurality of seats each of the plurality of seats comprising" should read --each of the plurality of seats comprising--.

Signed and Sealed this
Twenty-first Day of November, 2017

Joseph Matal
*Performing the Functions and Duties of the
Under Secretary of Commerce for Intellectual Property and
Director of the United States Patent and Trademark Office*